(12) United States Patent
Saito et al.

(10) Patent No.: US 11,742,107 B2
(45) Date of Patent: Aug. 29, 2023

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/949,561

(22) Filed: Sep. 21, 2022

(65) Prior Publication Data
US 2023/0102530 A1 Mar. 30, 2023

(30) Foreign Application Priority Data
Sep. 24, 2021 (JP) ................. 2021-155997

(51) Int. Cl.
*B60R 16/02* (2006.01)
*H01B 7/00* (2006.01)
*H02G 3/04* (2006.01)

(52) U.S. Cl.
CPC ....... *H01B 7/0045* (2013.01); *B60R 16/0215* (2013.01); *H02G 3/0406* (2013.01); *H02G 3/0468* (2013.01)

(58) Field of Classification Search
CPC .... B60R 6/207; B60R 6/0215; H02G 3/0418; H02G 3/0468; H02G 3/0481; H02G 3/32; H01B 7/0045
See application file for complete search history.

(56) References Cited

U.S. PATENT DOCUMENTS

| 7,278,190 | B2 * | 10/2007 | Fischer | F16L 3/223 |
| | | | | 248/74.2 |
| 2007/0128929 | A1 * | 6/2007 | Oga | F16L 3/1025 |
| | | | | 439/578 |
| 2009/0166480 | A1 * | 7/2009 | Sakata | H02G 3/0691 |
| | | | | 248/71 |
| 2014/0196929 | A1 | 7/2014 | Okuhara | |
| 2014/0299722 | A1 * | 10/2014 | Sampson | F16L 3/123 |
| | | | | 248/74.2 |
| 2017/0133827 | A1 * | 5/2017 | Sugino | H05K 9/0098 |
| 2019/0049142 | A1 * | 2/2019 | Balakrishna | F24F 13/22 |
| 2019/0089142 | A1 * | 3/2019 | Sugino | H02G 3/34 |

FOREIGN PATENT DOCUMENTS

| FR | 2880211 A1 * | 6/2006 | ............ F16L 3/1025 |
| JP | 2009038899 A * | 2/2009 | ............... H02G 3/30 |
| JP | 2013-055760 A | 3/2013 | |

\* cited by examiner

*Primary Examiner* — Paresh Paghadal
(74) *Attorney, Agent, or Firm* — Oliff PLC

(57) ABSTRACT

A wire harness including: a wire harness main body that includes an electric wire and an exterior tube that encloses an outer circumferential surface of the electric wire; a path restricting member that is attached to an outer circumferential surface of the exterior tube and restricts a path of the wire harness main body; and an attaching member that is attached to an outer circumferential surface of a portion of the path restricting member in a lengthwise direction of the path restricting member.

2 Claims, 11 Drawing Sheets

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumferential surface of the exterior member and is configured to restrict the path of the wire harness main body, has been known as a wire harness for a vehicle (for example, see JP 2013-55760A).

SUMMARY

Regarding the above wire harness, there is demand for an improvement in the positional accuracy of the path restricting member with respect to other members such as the exterior member.

An exemplary aspect of the disclosure provides a wire harness that is capable of improving the positional accuracy of a path restricting member.

A wire harness according to the present disclosure includes: a wire harness main body that includes an electric wire and an exterior tube that encloses an outer circumferential surface of the electric wire; a path restricting member that is attached to an outer circumferential surface of the exterior tube and restricts a path of the wire harness main body; and an attaching member that is attached to an outer circumferential surface of a portion of the path restricting member in a lengthwise direction of the path restricting member, wherein: the path restricting member includes a first insertion port that is open in a direction orthogonal to the lengthwise direction of the path restricting member, and extends over a full length of the path restricting member in the lengthwise direction of the path restricting member, the path restricting member includes a connecting portion that includes a first engagement, the attaching member includes a cover that covers an outer circumferential surface of the connecting portion, and the cover includes a second engagement that engages with the first engagement in the lengthwise direction of the wire harness main body.

A wire harness according to the present disclosure achieves the effect of improving the positional accuracy of the path restricting member.

DETAILED DESCRIPTION OF EMBODIMENTS

Description of Embodiments of Present Disclosure

Figure 1:
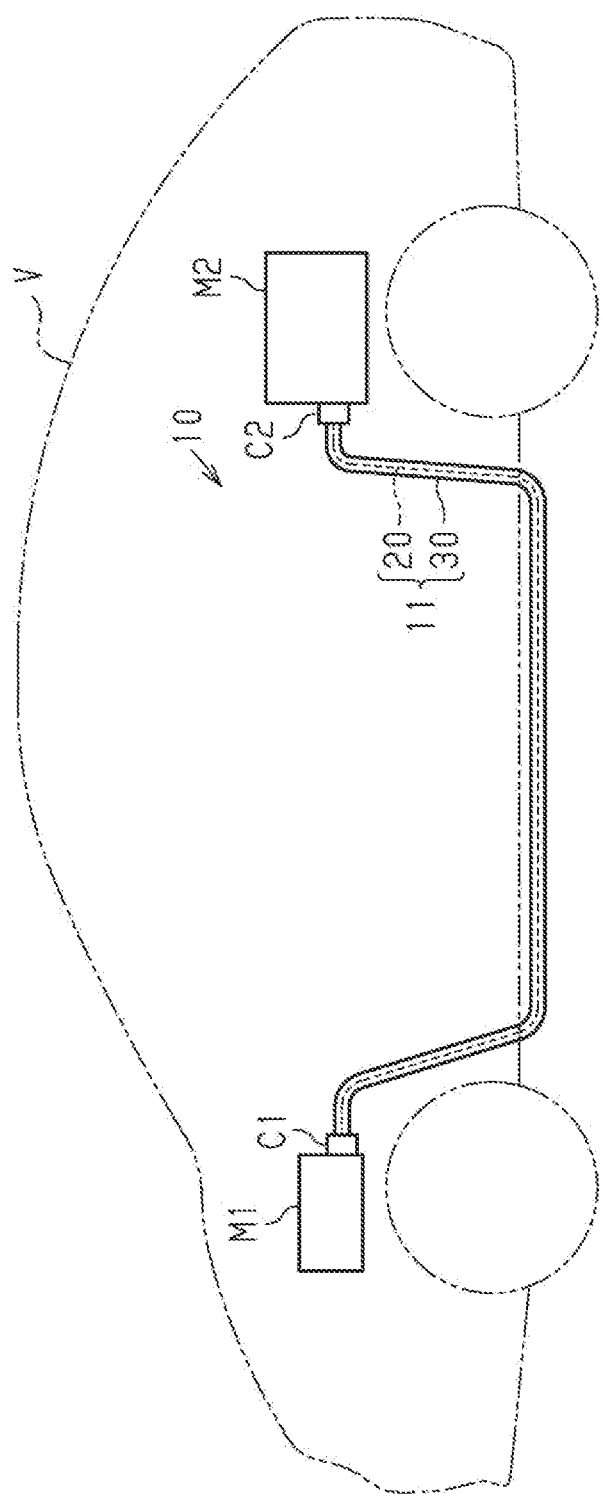
FIG. 1 is a schematic configuration diagram showing a wire harness according to an embodiment.

First, embodiments of the present disclosure will be listed and described.

[1] A wire harness according to the present disclosure includes: a wire harness main body that includes an electric wire member and an exterior member that encloses an outer circumferential surface of the electric wire member; a path restricting member that is attached to an outer circumferential surface of the exterior member and restricts a path of the wire harness main body; and an attaching member that is attached to an outer circumferential surface of a portion of the path restricting member in a lengthwise direction thereof, in which the path restricting member includes a first insertion port that is open in a direction orthogonal to the lengthwise direction of the path restricting member, and extends over the full length of the path restricting member in the lengthwise direction thereof, the path restricting member includes a connecting portion that includes a first engaging portion, the attaching member includes a covering portion that covers an outer circumferential surface of the connecting portion, and the covering portion includes a second engaging portion that engages with the first engaging portion in the lengthwise direction of the wire harness main body.

With this configuration, the connecting portion of the path restricting member and the covering portion of the attaching member are provided so as to overlap each other in the lengthwise direction of the wire harness main body. The connecting portion is provided with the first engaging portion, and the covering portion is provided with the second engaging portion that engages with the first engaging portion in the lengthwise direction of the wire harness main body. As a result of the first engaging portion and the second engaging portion engaging with each other, the path restricting member is prevented from moving in the lengthwise direction of the wire harness main body with respect to the attaching member. Therefore, it is possible to prevent the path restricting member from being displaced in the lengthwise direction of the wire harness main body with respect to the attaching member, and it is possible to improve the positional accuracy of the path restricting member with respect to the attaching member.

[2] It is preferable that either one of the first engaging portion and the second engaging portion is a recessed portion, and the other of the first engaging portion and the second engaging portion is a protruding portion that is fitted into the recessed portion through recess-protrusion fitting. With this configuration, as a result of the first engaging portion and the second engaging portion are fitted to each other through recess-protrusion fitting, the first engaging portion and the second engaging portion engage with each other in the lengthwise direction of the wire harness main body. As a result, it is possible to prevent the path restricting member from moving in the lengthwise direction of the wire harness main body with respect to the attaching member.

[3] It is preferable that the recessed portion is an elongated hole that is longer in the lengthwise direction of the wire harness main body than in a circumferential direction of the wire harness main body, and the elongated hole has a larger size than the protruding portion in the lengthwise direction of the wire harness main body. With this configuration, the protruding portion is movable within the elongated hole in the lengthwise direction of the wire harness main body. Therefore, it is possible to adjust the position of the path restricting member in the lengthwise direction of the wire harness main body, relative to the attaching member.

[4] It is preferable that, when the path restricting member is defined as a first path restricting member, the attaching member is a second path restricting member that is attached to the outer circumferential surface of the exterior member and restricts the path of the wire harness main body, the connecting portion is provided at an end portion of the first path restricting member in the lengthwise direction thereof, and the covering portion is provided at an end portion of the second path restricting member in a lengthwise direction thereof. With this configuration the first path restricting member and the second path restricting member are provided so as to partially overlap each other in the lengthwise direction of the wire harness main body. Specifically, the connecting portion provided at an end portion of the first path restricting member in the lengthwise direction thereof and the covering portion provided at an end portion of the second path restricting member in the lengthwise direction thereof are provided so as to overlap each other, in the lengthwise direction of the wire harness main body. As a result of the first engaging portion provided on the connecting portion and the second engaging portion provided on the covering portion engaging with each other, the first path restricting member is prevented from moving in the lengthwise direction of the wire harness main body with respect to the second path restricting member. Therefore, it is possible to prevent the first path restricting member from being displaced in the lengthwise direction of the wire harness main body with respect to the second path restricting member, and it is possible to improve the positional accuracy of the first path restricting member with respect to the second path restricting member. Furthermore, it is possible to improve the positional accuracy of the first path restricting member and the second path restricting member with respect to the wire harness main body. Therefore, it is possible to desirably restrict the path of the wire harness main body at a desired position, using the first path restricting member and the second path restricting member.

[5] It is preferable that the first path restricting member restricts a path of a straight section that is a straight section included in the path of the wire harness main body, and the second path restricting member restricts a path of a bent section that is a bent section included in the path of the wire harness main body. With this configuration, the path of the straight section is restricted by the first path restricting member, and the path of the bent section is restricted by the second path restricting member. As a result, the path of the straight section and the path of the bent section are both prevented from being displaced from desired paths.

[6] It is preferable that the covering portion is formed in an annular shape that encloses the entirety of the outer circumferential surface of the connecting portion and the entirety of an outer circumferential surface of a portion of the exterior member to which the connecting portion is attached, in a circumferential direction, and the covering portion includes a portion of a main body portion of the second path restricting member, and a lid portion that is coupled to the main body portion. With this configuration, while the covering portion has an annular shape, the covering portion is separated into the main body portion and the lid portion, and therefore the second path restricting member that includes the covering portion cab be retrofitted to the first path restricting member and the exterior member. As a result, it is possible to improve the assembly workability of the wire harness.

[7] It is preferable that the main body portion includes a second insertion port that is open in a direction orthogonal to the lengthwise direction of the second path restricting member, and extends over the full length of the second path restricting member in the lengthwise direction thereof, and the lid portion covers a portion of the second insertion port in the lengthwise direction of the second path restricting member. With this configuration, the second insertion port is open in a direction orthogonal to the lengthwise direction of the second path restricting member, and extends over the full length of the second path restricting member in the lengthwise direction thereof. As a result, it is possible to attach the second path restricting member to the exterior member from the second insertion port after performing terminal processing such as attaching the connectors to the end portions of the electric wire member in the lengthwise direction thereof. In this way, the second path restricting member can be retrofitted. Therefore, it is possible to improve the assembly workability of the wire harness.

[8] It is preferable that the first path restricting member includes: a first end portion and a second end portion that are two end portions of the first path restricting member in a circumferential direction thereof, and define the first insertion port; a coupling portion that couples the first end portion and the second end portion to each other; and a protruding portion that protrudes from an inner surface of at least one of the first end portion and the second end portion, and comes into contact with an outer surface of the exterior member. With this configuration, the first path restricting member includes a protruding portion that protrudes from the inner surface of at least one of the first end portion and the second end portion, and comes into contact with the outer surface of the exterior member. Therefore, it is possible to desirably prevent the first path restricting member from becoming unintentionally detached from the exterior member through the first insertion port.

[9] It is preferable that the first engaging portion is provided in an intermediate portion of the coupling portion in a circumferential direction thereof, the first engaging portion is a through hole that penetrates through the coupling portion in a radial direction of the exterior member, the second engaging portion is provided on an inner surface of the main body portion of the covering portion, and the second engaging portion is a first protruding portion that is fitted into the through hole through recess-protrusion fitting. With this configuration, as a result of the first protruding portion provided on the inner surface of the main body portion being fitted into the through hole provided in the coupling portion through recess-protrusion fitting, the through hole and the first protruding portion engage with each other in the lengthwise direction of the wire harness main body. As a result, it is possible to prevent the first path restricting member from moving in the lengthwise direction of the wire harness main body with respect to the second path restricting member. Also, the first protruding portion, which is the second engaging portion, is provided on the inner surface of the main body portion. Therefore, it is possible to prevent the first path restricting member from moving with respect to the second path restricting member in a state before the lid portion is closed.

[10] It is preferable that the first engaging portion is a cutout that extends from at least one of the first end portion and the second end portion in the circumferential direction of the first path restricting member, the second engaging portion is provided on an inner surface of the lid portion, and the second engaging portion is a second protruding portion that is fitted into the cutout through recess-protrusion fitting. With this configuration, as a result of the second protruding portion provided on the inner surface of the lid portion being fitted into the cutout provided in the end portion of the first path restricting member in the circumferential direction through recess-protrusion fitting, the cutout and the second protruding portion engage with each other in the lengthwise direction of the wire harness main body. As a result, it is possible to prevent the first path restricting member from moving in the lengthwise direction of the wire harness main body with respect to the second path restricting member. Also, due to the second protruding portion, which is the second engaging portion, being provided on the inner surface of the lid portion, the cutout and the lid portion can be fitted to each other through recess-protrusion fitting at the same time when the lid portion is closed.

Details of Embodiments of Present Disclosure

The following describes specific examples of a wire harness according to the present disclosure with reference to the drawings. In each drawing, for convenience of explanation, some parts of the configuration may be exaggerated or simplified. In addition, the dimensional ratio of each part may differ in each drawing. The terms "parallel" and "orthogonal" in the present specification are not limited to being strictly parallel and orthogonal, but may be substantially parallel and orthogonal within the range in which the actions and effects of the embodiments can be exhibited. Also, the term "tubular" used in descriptions included in the present specification is not limited to referring to a shape with a circumferential wall that is formed so as to be continuous all the way in the circumferential direction thereof, but may refer to a tubular shape constituted by a combination of a plurality of parts, or a shape with a cutout in a portion in a circumferential direction thereof, such as a C-shape. Note that examples of a "tubular" shape include, but are not limited to, a circular shape, an ellipsoidal shape, and a polygonal shape with sharp or rounded corners. Also, the term "annular" used in descriptions included in the present specification may refer to any structure that provides a loop, a continuous shape with no ends, and a typical loop shape with a C-shaped gap. Note that examples of an "annular" shape include, but are not limited to, a circular shape, an ellipsoidal shape, and a polygonal shape with sharp or rounded corners. It should be noted that the present disclosure is not limited to these examples, and is indicated by the scope of claims, and is intended to include all modifications within the meaning and scope equivalent to the scope of claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion of the wire harness 10 in the lengthwise direction thereof passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumferential surface of the electric wire member 20. The wire harness 10 has connectors C1 and C2 that are respectively attached to two end portions of the electric wire member 20. One end portion of the electric wire member 20 in the lengthwise direction thereof is connected to the inverter M1 via the connector C1, and the other end portion of the electric wire member 20 in the lengthwise direction thereof is connected to the high-voltage battery M2 via the connector C2.

Figure 2:
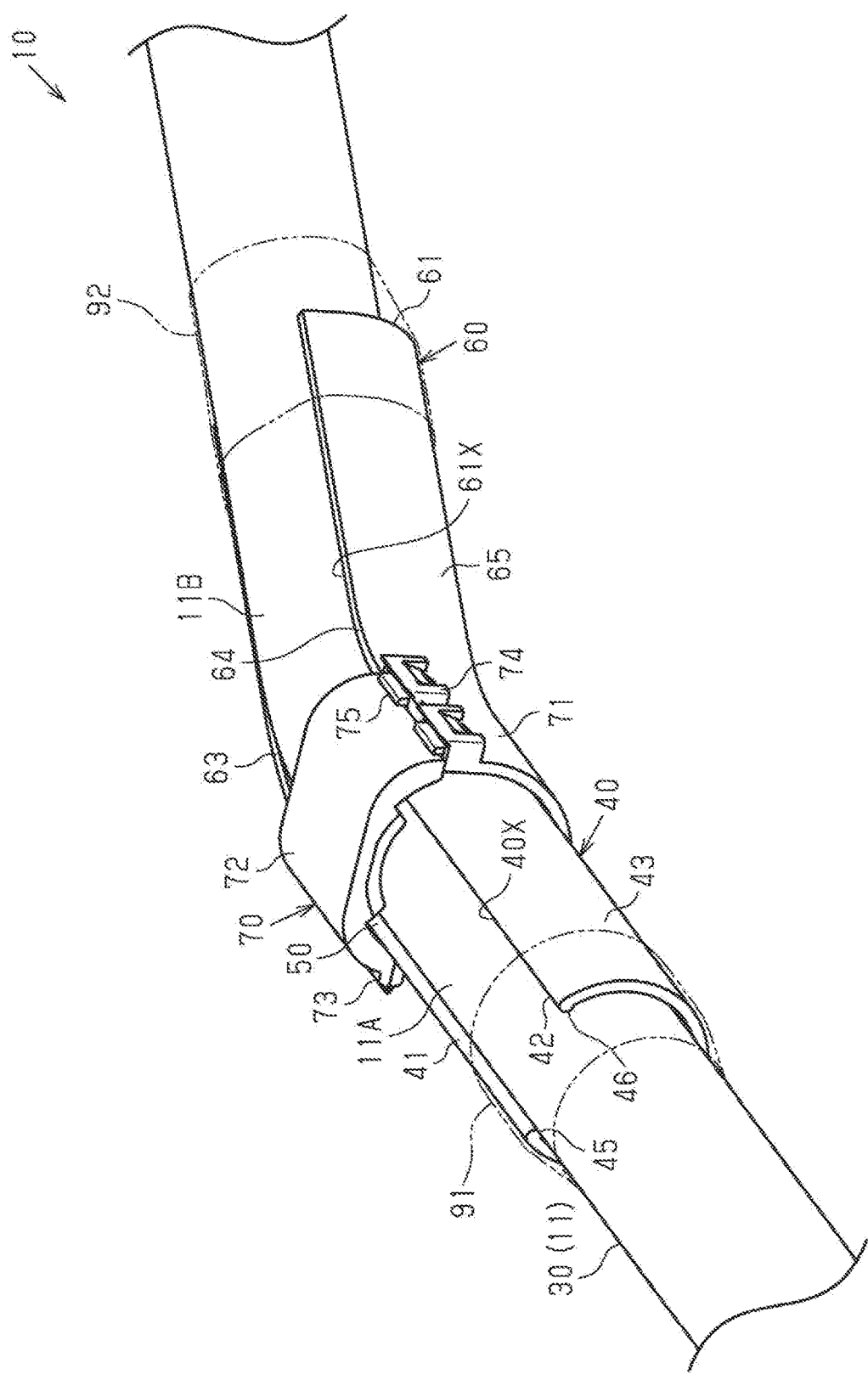
FIG. 2 is a schematic perspective view showing a wire harness according to an embodiment.
Figure 3:
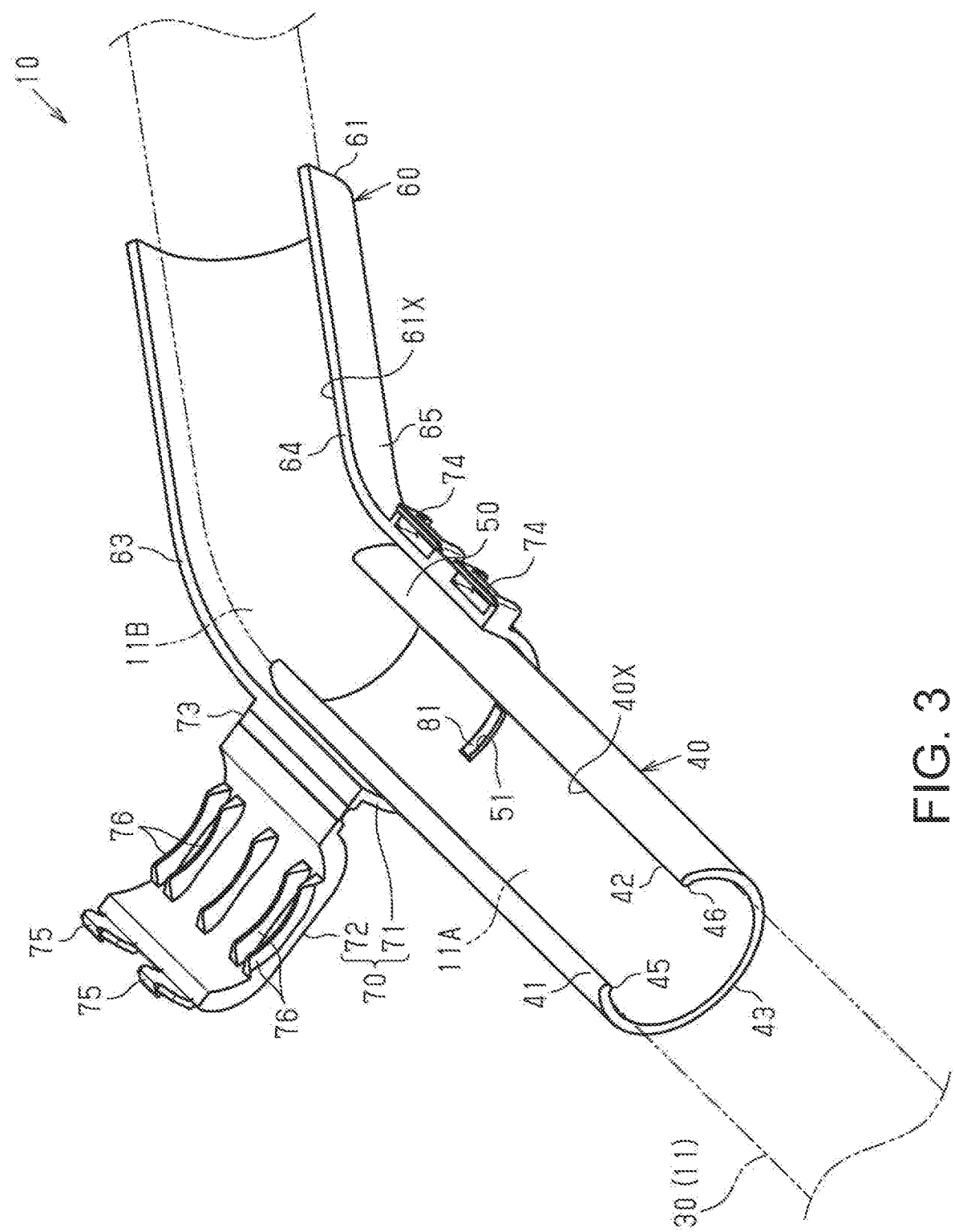
FIG. 3 is a schematic perspective view showing a wire harness according to an embodiment.

As shown in FIGS. 2 and 3, the wire harness 10 includes a first path restricting member 40 that is attached to the outer circumferential surface of the exterior member 30 and a second path restricting member 60 that is attached to the outer circumferential surface of the exterior member 30. The first path restricting member 40 and the second path restricting member 60 restrict the path along which the wire harness main body 11 is routed. Note that the first path restricting member 40 and the second path restricting member 60 are omitted from FIG. 1.

Configuration of Electric Wire Member 20

Figure 4:
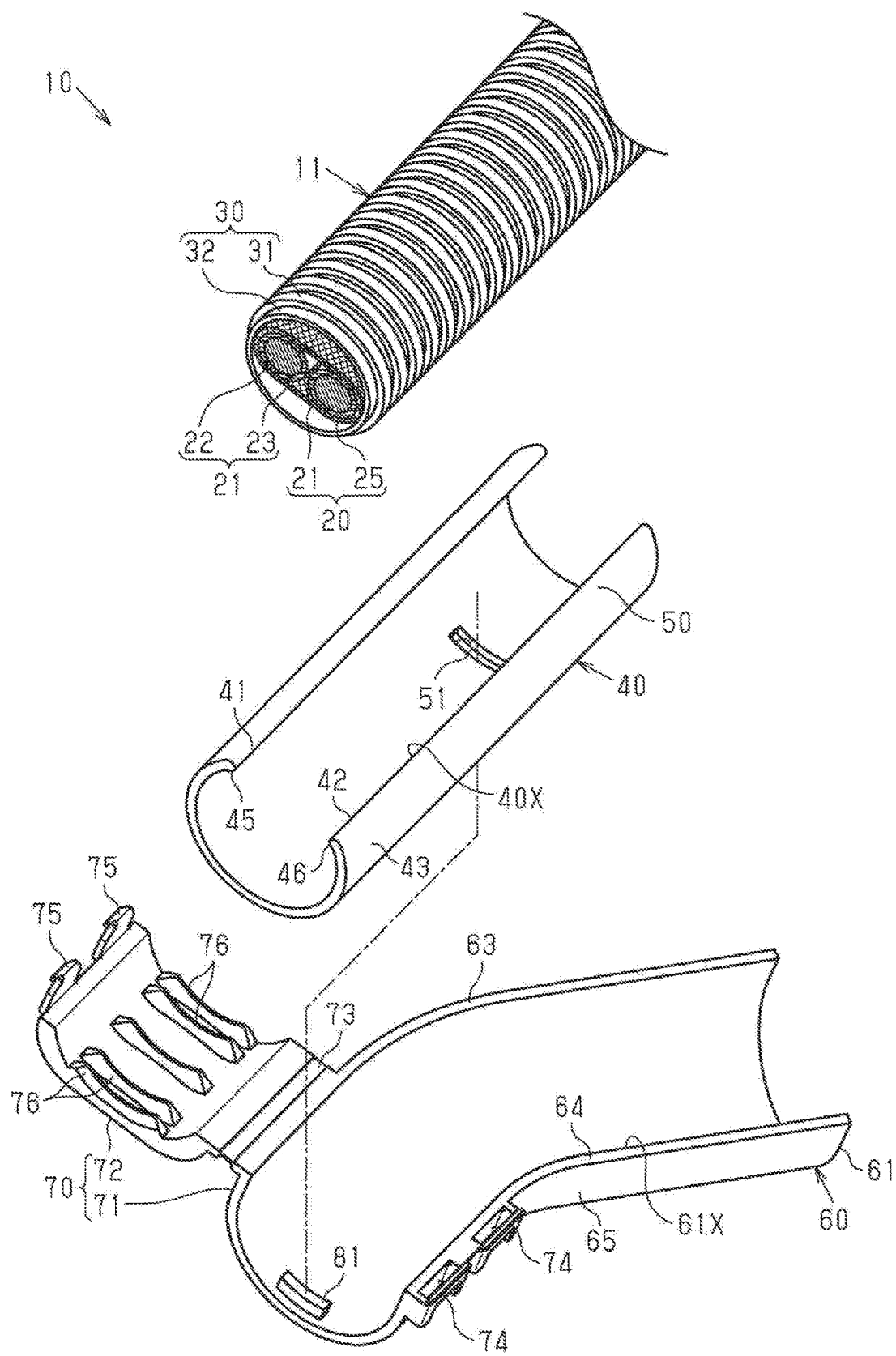
FIG. 4 is a schematic exploded perspective view showing a wire harness according to an embodiment.
Figure 5:
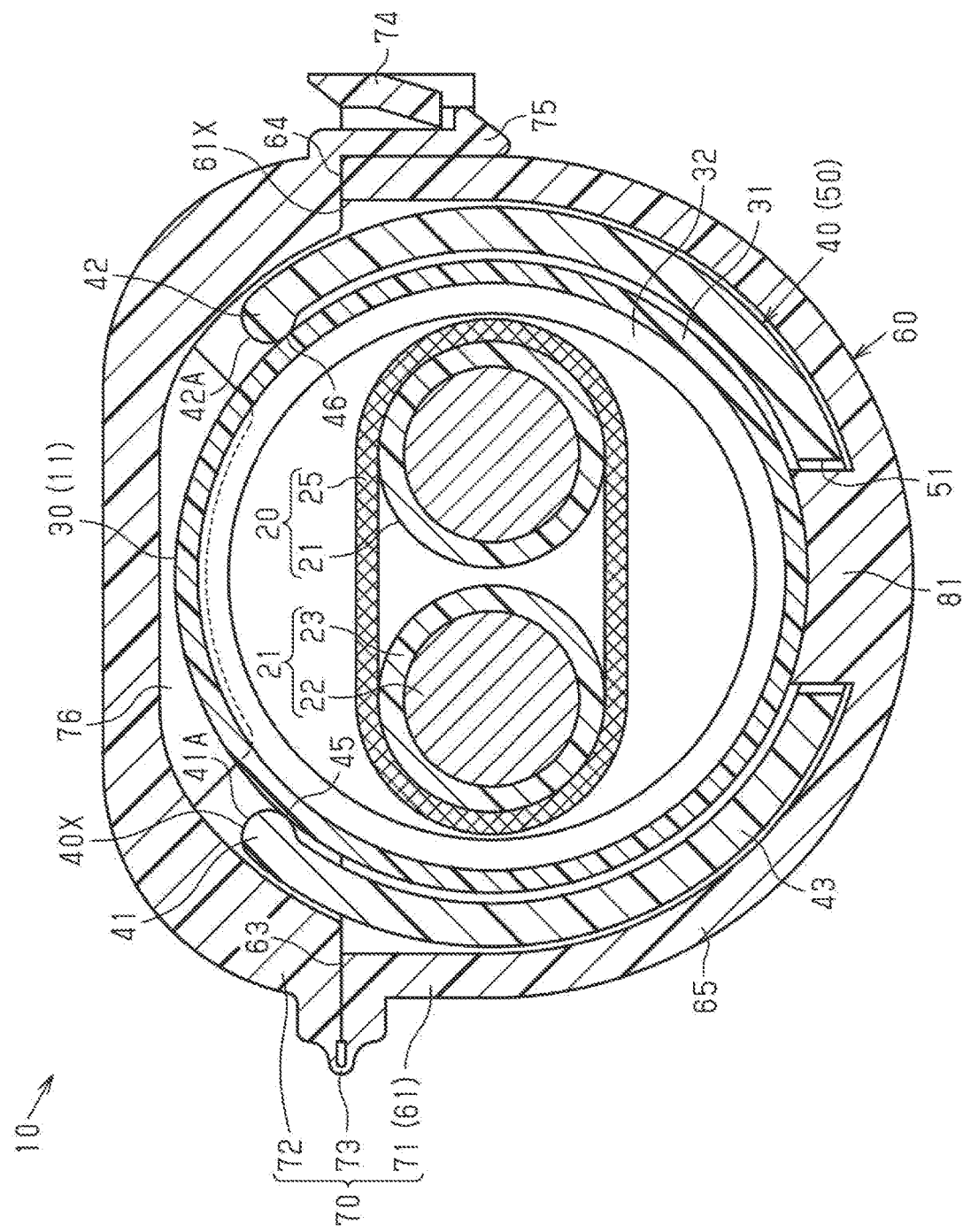
FIG. 5 is a schematic lateral cross-sectional view showing a wire harness according to an embodiment.

As shown in FIGS. 4 and 5, for example, the electric wire member 20 includes one or more electric wires 21 (two in the present embodiment) and a braided member 25 that collectively encloses the outer circumferential surfaces of the plurality of electric wires 21.

As shown in FIG. 5, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, i.e., the lateral cross-sectional shape of each wire 21, may be any shape. The lateral cross-sectional shape of each electric wire 21 may be, for example, a circular shape, a semicircular shape, a polygonal shape, a square shape, a flat shape, or the like. The lateral cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 4, the exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30 is, for example, sealed all the way around the circumferential surface of the exterior member 30. The exterior member 30 has, for example, a function of protecting the electric wire member 20 from flying objects and water droplets.

The exterior member 30 is, for example, flexible and easy to bend. Examples of the flexible exterior member 30 include a resin corrugated tube and a rubber waterproof cover. The exterior member 30 in the present embodiment is a resin corrugated tube that has a bellowed shape in which the diameter repeatedly increases and decreases in the lengthwise direction of the exterior member 30. That is to say, the exterior member 30 in the present embodiment has a bellowed structure in which annular protrusions 31 and annular recesses 32 are alternately provided in the lengthwise direction of the exterior member 30. The annular protrusions 31 and the annular recesses 32 each have an annular shape that extends around the exterior member 30 in the circumferential direction thereof, for example. As the material of the exterior member 30, a synthetic resin such as polyolefin, polyamide, polyester, or an ABS resin may be used, for example. In FIGS. 1 to 3, the exterior member 30 is simplified in order to simplify the drawings.

Configurations of First Path Restricting Member 40 and Second Path Restricting Member 60

As shown in FIGS. 2 and 3, the first path restricting member 40 and the second path restricting member 60 each hold the exterior member 30. The first path restricting member 40 and the second path restricting member 60 are each more rigid than the exterior member 30, for example. Compared to the outer member 30, the first path restricting member 40 and the second path restricting member 60 are each more rigid so as to be less bendable in a direction orthogonal to the lengthwise direction of the wire harness main body 11. With this configuration, the first path restricting member 40 and the second path restricting member 60 each restrict the path of the wire harness main body 11. For example, the first path restricting member 40 and the second path restricting member 60 each assist the exterior member 30 so that the wire harness main body 11 does not bend under its own weight or the like and does not deviate from a desired path.

The first path restricting member 40 is provided along a portion of the wire harness main body 11 in the lengthwise direction thereof. For example, the first path restricting member 40 is attached to the outer circumferential surface of the exterior member 30 along a straight section 11A, which is a straight section of the path of the wire harness main body 11. The first path restricting member 40 restricts the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 60 is provided along a portion of the wire harness main body 11 in the lengthwise direction thereof. For example, the second path restricting member 60 is attached to the outer circumferential surface of the exterior member 30 along a bent section 11B, which is a bent section of the path of the wire harness main body 11. The second path restricting member 60 restricts the path of the wire harness main body 11 in the bent section 11B. Here, the bent section 11B is a section in which the path of the wire harness main body 11 is bent two-dimensionally or three-dimensionally. Note that one or more second path restricting members 60 may be provided depending on the path of the wire harness main body 11.

Configuration of First Path Restricting Member 40

As shown in FIG. 5, the first path restricting member 40 covers a portion of the outer circumferential surface of the exterior member 30 in the circumferential direction of the exterior member 30. The first path restricting member 40 has a tubular shape that covers a portion of the outer circumferential surface of the exterior member 30 in the circumferential direction thereof. The first path restricting member 40 has a C-like horizontal cross-sectional shape as a whole. For example, the first path restricting member 40 covers a range larger than half of the outer circumferential surface of the exterior member 30. That is to say, the first path restricting member 40 covers a range larger than half of the outer circumferential surface of the exterior member 30 in the circumferential direction of the exterior member 30. As shown in FIG. 3, the first path restricting member 40 extends along the straight section 11A in the lengthwise direction of the exterior member 30. For example, the first path restricting member 40 is formed in a shape that extends straight in one direction. For example, the horizontal cross-sectional shape of the first path restricting member 40 is uniform over substantially the entirety of the first path restricting member 40 in the lengthwise direction thereof.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using a well-known manufacturing method such as extrusion molding or injection molding, for example.

The first path restricting member 40 has a first insertion port 40X that is open in a direction orthogonal to the lengthwise direction of the first path restricting member 40. The first path restricting member 40 includes a first end portion 41 and a second end portion 42 that are two end portions of the first path restricting member 40 in the circumferential direction thereof and define the first insertion port 40X. The first path restricting member 40 includes a coupling portion 43 that couples the first end portion 41 and the second end portion 42 to each other. In other words, the first path restricting member 40 includes a coupling portion 43 that is formed so as to cover a portion of the exterior member 30 in the circumferential direction thereof, the first end portion 41 and the second end portion 42 that are provided at two end portions of the coupling portion 43, and the first insertion port 40X that is defined by the first end portion 41 and the second end portion 42.

As shown in FIG. 5, the coupling portion 43 constitutes a main portion of the first path restricting member 40. The thickness of the coupling portion 43 in a radial direction is uniform in the circumferential direction of the first path restricting member 40, for example. The horizontal cross-sectional shape of the coupling portion 43 is a shape that matches the outer surface of the exterior member 30. For example, the first end portion 41, the second end portion 42, and the coupling portion 43 each have an arc-like horizontal cross-sectional shape.

The first end portion 41 and the second end portion 42 are provided opposite to each other in the circumferential direction of the first path restricting member 40. The first end portion 41 and the second end portion 42 are separated from each other in the circumferential direction of the first path restricting member 40 with the first insertion port 40X being interposed therebetween. In other words, the gap between the first end portion 41 and the second end portion 42 in the circumferential direction of the first path restricting member 40 is provided as the first insertion port 40X. As described above, the first path restricting member 40 is formed in a C shape in which the first insertion port 40X is provided at a portion of the first path restricting member 40 in the circumferential direction thereof.

The first end portion 41 includes a first leading end 41A. The second end portion 42 includes a second leading end 42A. The first leading end 41A and the second leading end 42A define the first insertion port 40X. In other words, the first leading end 41A and the second leading end 42A constitute the inner surface of the first insertion port 40X. The first leading end 41A and the second leading end 42A are formed in a curved shape when seen in the lengthwise direction of the first path restricting member 40. That is to say, the first leading end 41A and the second leading end 42A each have a curved horizontal cross-sectional shape. The first leading end 41A and the second leading end 42A in the present embodiment each have a semicircular horizontal cross-sectional shape.

For example, the first path restricting member 40 includes a protruding portion 45 (protrusion) that protrudes from the inner surface of the first end portion 41, and a protruding portion 46 (protrusion) that protrudes from the inner surface of the second end portion 42. The protruding portions 45 and 46 each protrude toward the exterior member 30 inserted into the first path restricting member 40, and come into contact with the outer surface of the exterior member 30. For example, the protruding portions 45 and 46 each come into contact with the outer surfaces of the annular protrusions 31 of the exterior member 30. For example, the protruding portion 45 protrudes from the inner surface of the first leading end 41A of the first end portion 41. For example, the protruding portion 46 protrudes from the inner surface of the second leading end 42A of the second end portion 42. For example, the protruding portions 45 and 46 each have a curved horizontal cross-sectional shape. The protruding portions 45 and 46 in the present embodiment each have a semicircular horizontal cross-sectional shape.

As shown in FIG. 3, the protruding portions 45 and 46 extend in the lengthwise direction of the first path restricting member 40. For example, the protruding portions 45 and 46 each extend over the full length of the first path restricting member 40 in the lengthwise direction thereof.

For example, the protruding portions 45 and 46 each press the exterior member 30 from the outside of the exterior member 30. For example, the exterior member 30 is elastically held by the protruding portion 45, the protruding portion 46, and the coupling portion 43. As a result, the first path restricting member 40 is firmly coupled to the exterior member 30. Therefore, the first path restricting member 40 attached to the outer circumferential surface of the exterior member 30 is prevented from moving in the lengthwise direction of the exterior member 30.

As shown in FIG. 5, the opening width of the first insertion port 40X, i.e., the shortest distance between the first end portion 41 and the second end portion 42, is smaller than the outer diameter of the exterior member 30, for example.

As shown in FIG. 4, the first insertion port 40X extends in the lengthwise direction of the first path restricting member 40. The first insertion port 40X extends over the full length of the first path restricting member 40 in the lengthwise direction thereof. That is to say, the first insertion port 40X is formed so as to be open in a direction orthogonal to the lengthwise direction of the first path restricting member 40 and so as to be open at the two ends of the first path restricting member 40 in the lengthwise direction thereof.

As a result of inserting the exterior member 30 into the first insertion port 40X in a direction orthogonal to the lengthwise direction of the first path restricting member 40, the first path restricting member 40 elastically deforms and the opening width of the first insertion port 40X increases. When the exterior member 30 is inserted into the first path restricting member 40, the first path restricting member 40 elastically deforms to return to the original shape thereof. As a result, the opening width of the first insertion port 40X becomes smaller than the outer diameter of the exterior member 30, and the first path restricting member 40 is attached to the outer circumferential surface of the exterior member 30.

The first path restricting member 40 includes a connecting portion 50 that is to be connected to the second path restricting member 60. For example, the connecting portion 50 is provided at an end portion of the first path restricting member 40 in the lengthwise direction thereof.

The connecting portion 50 includes a through hole 51 that serves as a first engaging portion (first engagement). For example, the through hole 51 penetrates through the coupling portion 43 of the connecting portion 50 in a radial direction of the exterior member 30. For example, the through hole 51 extends in the circumferential direction of the wire harness main body 11. For example, the through hole 51 is formed so as to be longer in the circumferential direction of the wire harness main body 11 than in the lengthwise direction of the wire harness main body 11. For example, the through hole 51 is formed in an elongated slit shape that extends straight in the circumferential direction of the wire harness main body 11. For example, the through hole 51 is formed so that the size thereof in the circumferential direction of the wire harness main body 11 is twice or more as large as the size thereof in the lengthwise direction of the wire harness main body 11. For example, the through hole 51 has a rectangular shape when seen in the penetration direction of the through hole 51. For example, the through hole 51 is provided in an intermediate portion of the coupling portion 43 of the connecting portion 50 in the circumferential direction. For example, the through hole 51 is located so as to overlap the first insertion port 40X in a radial direction of the exterior member 30, in the circumferential direction of the coupling portion 43. For example, the through hole 51 is provided in a portion of the connecting portion 50 in the lengthwise direction thereof. For example, the through hole 51 is provided at a position separated from a first end surface of the first path restricting member 40, which constitutes the connecting portion 50, in the lengthwise direction thereof.

Configuration of Second Path Restricting Member 60

As shown in FIGS. 2 and 3, the second path restricting member 60 is attached to the outer circumferential surface of the exterior member 30 in the bent section 11B. The second path restricting member 60 extends in the lengthwise direction of the exterior member 30 in the bent section 11B. The second path restricting member 60 is bent along the shape of the bent section 11B, for example.

The second path restricting member 60 is made of metal or resin, for example. The second path restricting member 60 in the present embodiment is made of resin. As the material of the second path restricting member 60, a synthetic resin such as polypropylene, polyamide, or polyacetal may be used, for example. The second path restricting member 60 may be manufactured using a well-known manufacturing method such as extrusion molding or injection molding, for example.

The second path restricting member 60 includes a main body portion 61 and a covering portion 70 that covers a portion of the first path restricting member 40 in the lengthwise direction thereof.

The main body 61 is formed in an elongated shape that extends in the lengthwise direction of the exterior member 30 in the bent section 11B. For example, the main body portion 61 extends along the path of the bent section 11B. That is to say, the main body portion 61 has a bent shape that is bent along the shape of the bent section 11B. The main body portion 61 covers a portion of the outer circumferential surface of the exterior member 30 in the circumferential direction of the exterior member 30. The main body portion 61 covers approximately half the range of the outer circumferential surface of the exterior member 30. For example, the main body portion 61 covers a range of approximately 180° of the outer circumferential surface of the exterior member 30. For example, the main body portion 61 has a substantially semi-cylindrical shape.

The main body portion 61 is provided with a second insertion port 61X that is open in a direction orthogonal to the lengthwise direction of the second path restricting member 60. The main body portion 61 includes a third end portion 63 and a fourth end portion 64 that are two end portions of the main body portion 61 in the circumferential direction thereof. The main body portion 61 includes an intermediate portion 65 that is provided between the third end portion 63 and the fourth end portion 64. In other words, the main body portion 61 includes an intermediate portion 65 that is formed so as to cover a portion of the exterior member 30 in the circumferential direction thereof, the third end portion 64 and the fourth end portion 64 that are provided at two end portions of the intermediate portion 65, and the second insertion port 61X that is defined by the third end portion 63 and the fourth end portion 64.

As shown in FIG. 5, the intermediate portion 65 constitutes a main portion of the main body portion 61. For example, the horizontal cross-sectional shape of the intermediate portion 65 is a shape that matches the outer surface of the exterior member 30. For example, the horizontal cross-sectional shape of the intermediate portion 65 is a shape that matches the outer surface of the first path restricting member 40. For example, the third end portion 63, the fourth end portion 64, and the intermediate portion 65 each have an arc-like or U-like horizontal cross-sectional shape.

The third end portion 63 and the fourth end portion 64 are provided opposite to each other in the circumferential direction of the main body portion 61. The third end portion 63 and the fourth end portion 64 are separated from each other in the circumferential direction of the main body portion 61 with the second insertion port 61X being interposed therebetween. In other words, the gap between the third end portion 63 and the fourth end portion 64 in the circumferential direction of the main body portion 61 is provided as the second insertion port 61X. As described above, the main body portion 61 in the present embodiment is formed in a U shape that has the second insertion port 61X in a portion of the second path restricting member 60 in the circumferential direction thereof.

The opening width of the second insertion port 61X, i.e., the shortest distance between the third end portion 63 and the fourth end portion 64, is smaller than the outer diameter of the exterior member 30, or is larger than the outer diameter of the exterior member 30, for example.

As shown in FIGS. 3 and 4, the second insertion port 61X extends in the lengthwise direction of the second path restricting member 60. The second insertion port 61X extends over the full length of the second path restricting member 60 in the lengthwise direction thereof. That is to say, the second insertion port 61X is formed so as to be open in a direction orthogonal to the lengthwise direction of the second path restricting member 60 and so as to be open at the two ends of the second path restricting member 60 in the lengthwise direction thereof. The exterior member 30 is inserted into the second insertion port 61X in a direction orthogonal to the lengthwise direction of the second path restricting member 60. Also, the first path restricting member 40 is inserted into the second insertion port 61X in a direction orthogonal to the lengthwise direction of the second path restricting member 60.

As shown in FIGS. 2 and 3, the covering portion 70 is provided at one end portion of the second path restricting member 60 in the lengthwise direction thereof, for example. For example, the covering portion 70 is provided so as to overlap the connecting portion 50 in a radial direction of the exterior member 30. That is to say, in the wire harness 10, one end portion of the first path restricting member 40 in the lengthwise direction thereof and one end portion of the second path restricting member 60 in the lengthwise direction thereof overlap each other in the lengthwise direction of the wire harness main body 11.

As shown in FIG. 5, the covering portion 70 covers the outer circumferential surface of the connecting portion 50, for example. For example, the covering portion 70 is formed in an annular shape that encloses the entirety of the outer circumferential surface of the connecting portion 50 and the entirety of the outer circumferential surface of the portion of the exterior member 30 to which the connecting portion 50 is attached, in the circumferential direction.

The covering portion 70 includes a covering main body portion 71 that is an end portion of the main body portion 61 in the lengthwise direction thereof, and a lid portion 72 (lid) that is coupled to the covering main body portion 71. The covering main body portion 71 is a portion of the main body portion 61, and therefore includes the second insertion port 61X, the third end portion 63, the fourth end portion 64, and the intermediate portion 65. For example, the intermediate portion 65 of the covering main body portion 71 covers the outer circumferential surface of the coupling portion 43 in the connecting portion 50. For example, the intermediate portion 65 of the covering main body portion 71 covers the outer circumferential surface of a portion of the coupling portion 43 in the circumferential direction thereof.

For example, the lid portion 72 is formed so as to be integrated with the covering main body portion 71. For example, the horizontal cross-sectional shape of the inner surface of the lid portion 72 is a shape that matches the outer surface of the exterior member 30. For example, the horizontal cross-sectional shape of the inner surface of the lid portion 72 is formed in an ellipsoidal arc shape or an oval arc shape. For example, the lid portion 72 is formed in a substantially semi-ellipsoidal cylinder shape. Here, an "ellipsoid" in the present specification is a shape that is constituted by two parallel lines that have substantially the same length, and two semicircles.

As shown in FIG. 4, the lid portion 72 covers a portion of the second insertion port 61X of the main body portion 61 in the lengthwise direction of the second path restricting member 60. The lid portion 72 covers the second insertion port 61X in the covering main body portion 71. For example, the lid portion 72 covers the second insertion port 61X only in the covering main body portion 71 in the lengthwise direction of the main body portion 61.

For example, the covering portion 70 has a hinge portion 73 that connects the covering main body portion 71 and the lid portion 72 with each other. The hinge portion 73 connects one end of the covering main body portion 71 in the circumferential direction thereof and one end of the lid portion 72 in the circumferential direction thereof, with each other. The other end of the covering main body portion 71 in the circumferential direction thereof is provided with one or more (two in the present embodiment) lock portions 74. The other end of the lid portion 72 in the circumferential direction thereof is provided with one or more (two in the present embodiment) claw portions 75.

The lid portion 72 is rotatable about the hinge portion 73, which serves as an axis, between the open position shown in FIG. 3 and the closed position shown in FIG. 2. As shown in FIG. 5, when the lid portion 72 is at the closed position, the claw portions 75 are caught on the lock portions 74. As a result, the lid portion 72 is held in the closed position. Thus, the covering main body portion 71 and the lid portion 72 are coupled to each other. In the state where the covering main body portion 71 and the lid portion 72 are coupled to each other, the covering portion 70 has an annular shape that collectively encloses the respective outer circumferential surfaces of the exterior member 30 and the connecting portion 50. At the closed position, the lid portion 72 covers the second insertion port 61X in the covering main body portion 71. For example, at the closed position, the lid portion 72 covers the first insertion port 40X in the connecting portion 50.

Figure 6:
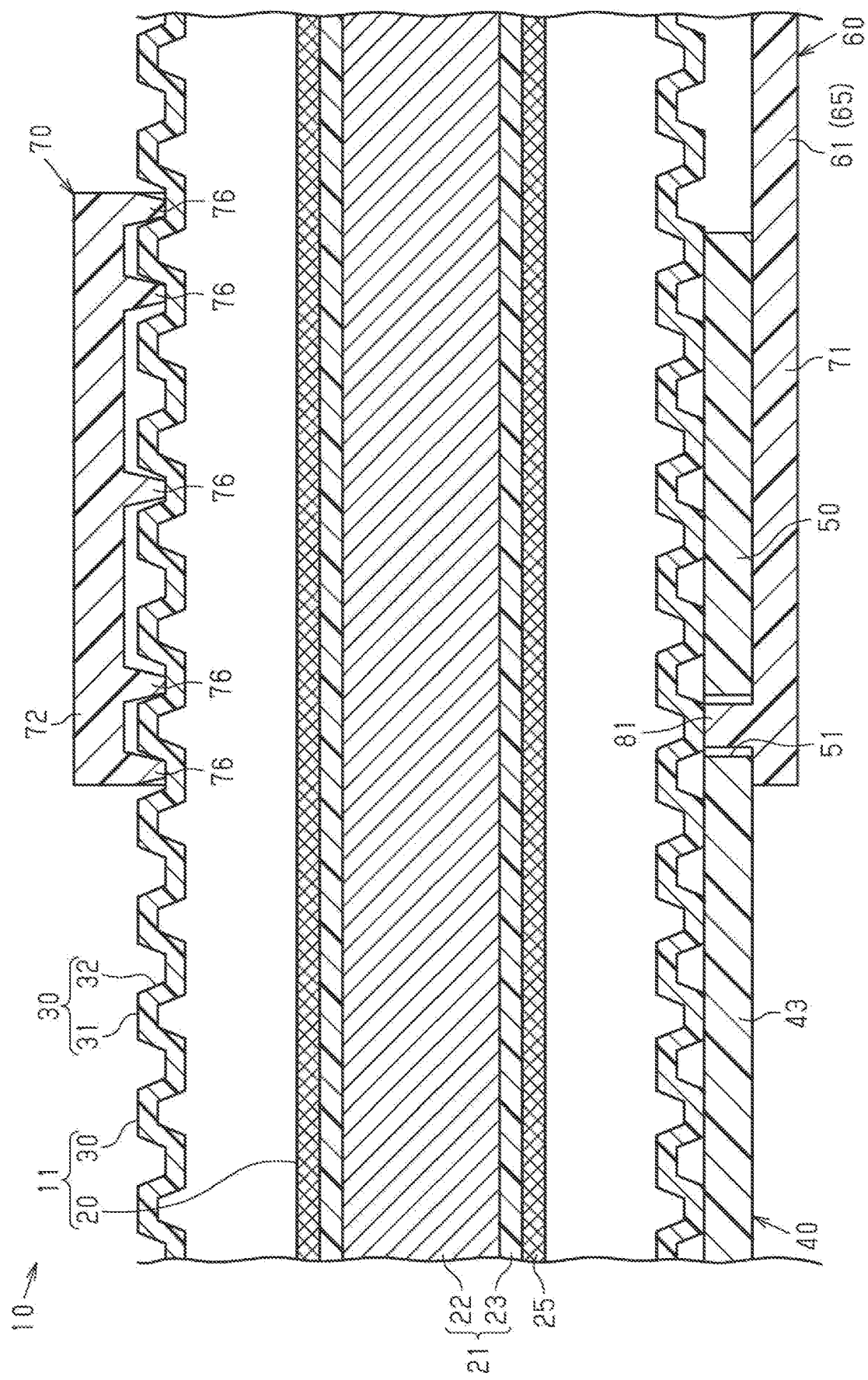
FIG. 6 is a schematic cross-sectional view showing a wire harness according to an embodiment.

As shown in FIG. 6, the covering portion 70 has a protruding portion 81 (protrusion) that serves as a second engaging portion (second engagement). The protruding portion 81 is formed so as to be able to engage with the through hole 51 in the lengthwise direction of the wire harness main body 11. The protruding portion 81 can be fitted into the through hole 51 through recess-protrusion fitting. For example, the protruding portion 81 protrudes from the inner surface of the covering main body portion 71, in a direction orthogonal to the lengthwise direction of the wire harness main body 11. For example, the protruding portion 81 protrudes from the inner surface of the covering main body portion 71 toward the connecting portion 50.

For example, as shown in FIG. 4, the protruding portion 81 extends in the circumferential direction of the wire harness main body 11. For example, the protruding portion 81 is formed so as to be longer in the circumferential direction of the wire harness main body 11 than in the lengthwise direction of the wire harness main body 11. For example, the protruding portion 81 is formed so that the size thereof in the circumferential direction of the wire harness main body 11 is twice or more as large as the size thereof in the lengthwise direction of the wire harness main body 11. For example, the protruding portion 81 is provided on a portion of the covering main body portion 71 in the circumferential direction thereof. For example, the protruding portion 81 is provided on an intermediate portion of the intermediate portion 65 of the covering main body portion 71 in the circumferential direction. For example, the protruding portion 81 is provided on a portion of the covering main body portion 71 in the lengthwise direction. The protruding portion 81 is formed in a size with which the protruding portion 81 can be fitted into the through hole 51. For example, the protruding portion 81 has a smaller size than the through hole 51 in the lengthwise direction of the wire harness main body 11. For example, the protruding portion 81 has a smaller size than the through hole 51 in the circumferential direction of the wire harness main body 11.

For example, as shown in FIG. 5, the protruding portion 81 protrudes from the inner surface of the covering main body portion 71 toward the exterior member 30. For example, the protruding portion 81 is formed so as to protrude to a position that is inward of the inner surface of the connecting portion 50 in a radial direction of the exterior member 30. For example, the protruding portion 81 is formed so that the leading end of the protruding portion 81 comes into contact with the outer surface of the exterior member 30. For example, the leading end of the protruding portion 81 comes into contact with the outer surfaces of annular protrusions 31 of the exterior member 30. For example, the leading end of the protruding portion 81 is formed in a shape that matches the outer surface of the exterior member 30. For example, the leading end of the protruding portion 81 has an arc shape that expands along the outer surface of the exterior member 30.

As shown in FIG. 6, when the protruding portion 81 is fitted into the through hole 51 through recess-protrusion fitting, the through hole 51 and the protruding portion 81 engage with each other in the lengthwise direction of the wire harness main body 11. Specifically, when the protruding portion 81 is fitted into the through hole 51 through recess-protrusion fitting, the inner surface of the through hole 51 and side surfaces of the protruding portion 81 engage with each other in the lengthwise direction of the wire harness main body 11. As a result, the first path restricting member 40 and the second path restricting member 60 are less likely to move relative to each other in the lengthwise direction of the wire harness main body 11. Also, when the protruding portion 81 is fitted into the through hole 51, the first path restricting member 40 is positioned with respect to the second path restricting member 60 in the lengthwise direction of the wire harness main body 11. As a result, the width of the overlap of the first path restricting member 40 and the second path restricting member 60 is adjusted in the lengthwise direction of the wire harness main body 11.

As shown in FIG. 5, when the protruding portion 81 is fitted into the through hole 51 through recess-protrusion fitting, the through hole 51 and the protruding portion 81 engage with each other in the circumferential direction of the wire harness main body 11. Specifically, when the protruding portion 81 is fitted into the through hole 51 through recess-protrusion fitting, the inner surface of the through hole 51 and side surfaces of the protruding portion 81 engage with each other in the circumferential direction of the wire harness main body 11. As a result, the first path restricting member 40 and the second path restricting member 60 are less likely to move relative to each other in the circumferential direction of the wire harness main body 11. As a result, the first path restricting member 40 is prevented from moving in the circumferential direction of the wire harness main body 11 in the second path restricting member 60. Also, when the protruding portion 81 is fitted into the through hole 51, the first path restricting member 40 is positioned with respect to the second path restricting member 60 in the circumferential direction of the wire harness main body 11. As a result, the orientation of the first path restricting member 40, specifically the orientation of the first insertion port 40X, is adjusted with respect to the second path restricting member 60 in the circumferential direction of the wire harness main body 11. In other words, the position of the first insertion port 40X in the first path restricting member 40 in the circumferential direction is determined by the through hole 51 and the protruding portion 81 engaging with the through hole 51. In the present embodiment, when the protruding portion 81 is fitted into the through hole 51, the position of the first insertion port 40X in the first path restricting member 40 is set so as to face toward the lid portion 72 of the covering portion 70. Here, in the state where the connecting portion 50 is fitted at a position that is inward of the covering main body portion 71 of the covering portion 70, a portion of the connecting portion 50 in the circumferential direction protrudes to a position that is outward (upward in the figure) of the third end portion 63 and the fourth end portion 64 of the covering main body portion 71. The first end portion 41, the second end portion 42, and the first insertion port 40X of the connecting portion 50 are located so as to protrude farther toward the inner surface of the lid portion 72 than the third end portion 63 and the fourth end portion 64 of the covering main body portion 71.

As shown in FIG. 4, the lid portion 72 is provided with one or more (five in the present embodiment) protrusions 76 that protrude from the inner surface of the lid portion 72. The plurality of protrusions 76 are provided at intervals in the lengthwise direction of the second path restricting member 60. For example, the protrusions 76 are provided on an intermediate portion of the lid portion 72 in the circumferential direction. For example, as shown in FIG. 6, when the lid portion 72 is at the closed position, the protrusions 76 each protrude toward the exterior member 30 inserted into the second path restricting member 60. For example, the protrusions 76 are formed so as to be fitted into the annular recesses 32 of the exterior member 30 when the lid portion 72 is at the closed position. For example, the protrusions 76 are formed so that the leading ends of the protrusions 76 come into contact with the outer surfaces of the annular recesses 32. For example, the leading end of each protrusion 76 has an arc shape that expands along the outer surface of an annular recess 32. Each protrusion 76 is fitted into a different annular recess 32. As a result, the exterior member 30 is prevented from moving in the lengthwise direction of the exterior member 30 with respect to the second path restricting member 60. Therefore, it is possible to desirably prevent the second path restricting member 60 from being displaced in the lengthwise direction of the wire harness main body 11 with respect to the exterior member 30. Also, the exterior member 30 and the first path restricting member 40 are prevented from moving in a radial of the exterior member 30 with respect to the second path restricting member 60. Therefore, it is possible to desirably prevent the recess-protrusion fitting of the through hole 51 and the protruding portion 81 from becoming unintentionally detached.

Configurations of Fixing Members 91 and 92

For example, as shown in FIG. 2, the wire harness 10 has a fixing member 91 that fixes the first path restricting member 40 to the outer circumferential surface of the exterior member 30. For example, the wire harness 10 has a fixing member 92 that fixes the second path restricting member 60 to the outer circumferential surface of the exterior member 30. Resin or metal band ties, caulking rings, pieces of adhesive tape, or the like may be used as the fixing members 91 and 92, for example. The fixing members 91 and 92 in the present embodiment are pieces of adhesive tape.

For example, the fixing member 91 is formed so as to fix the end portion that is provided opposite to the connecting portion 50, of the end portions of the first path restricting member 40 in the lengthwise direction thereof, to the outer surface of the exterior member 30. For example, the fixing member 91 is wound from the end portion of the first path restricting member 40 in the lengthwise direction thereof to the exterior member 30. As a result, it is possible to prevent the first path restricting member 40 from moving in the lengthwise direction and the circumferential direction of the wire harness main body 11 with respect to the exterior member 30. For example, the fixing member 92 is formed so as to fix the end portion that is provided opposite to the covering portion 70, of the end portions of the second path restricting member 60 in the lengthwise direction, to the outer surface of the exterior member 30. For example, the fixing member 92 is wound from the end portion of the second path restricting member 60 in the lengthwise direction to the exterior member 30. As a result, it is possible to prevent the second path restricting member 60 from moving in the lengthwise direction and the circumferential direction of the wire harness main body 11 with respect to the exterior member 30.

Next, actions of the present embodiment will be described.

The connecting portion 50 provided at an end portion of the first path restricting member 40 in the lengthwise direction thereof and the covering portion 70 provided at an end portion of the second path restricting member 60 in the lengthwise direction thereof are provided so as to overlap each other, in the lengthwise direction of the wire harness main body 11. Here, the connecting portion 50 of the first path restricting member 40 is provided with the through hole 51. Also, the covering portion 70 of the second path restricting member 60 is provided with the protruding portion 81 that engages with the through hole 51 in the lengthwise direction of the wire harness main body 11. As a result of the through hole 51 and the protruding portion 81 engaging with each other, the first path restricting member 40 is prevented from moving in the lengthwise direction of the wire harness main body 11 with respect to the second path restricting member 60.

Next, effects of the present embodiment will be described.

(1) The connecting portion 50 is provided with the through hole 51, and the covering portion 70 is provided with the protruding portion 81 that engages with the through hole 51 in the lengthwise direction of the wire harness main body 11. With this configuration, the above-described actions are achieved, and therefore it is possible to prevent the first path restricting member 40 from being displaced with respect to the second path restricting member 60 in the lengthwise direction of the wire harness main body 11. Therefore, it is possible to improve the positional accuracy of the first path restricting member 40 with respect to the second path restricting member 60. Here, in the present embodiment, the second path restricting member 60 is fixed to the exterior member 30 of the wire harness main body 11 by the fixing member 92. Therefore, the second path restricting member 60 is prevented from moving in the lengthwise direction of the wire harness main body 11 with respect to the wire harness main body 11. Therefore, by improving the positional accuracy of the first path restricting member 40 with respect to the second path restricting member 60, it is possible to improve the positional accuracy of the first path restricting member 40 with respect to the wire harness main body 11. As a result, it is possible to desirably place the first path restricting member 40 at a desirable position in the wire harness main body 11, which is in the straight section 11A in this example, and it is possible to desirably restrict the path of the straight section 11A, using the first path restricting member 40. In other words, it is possible to prevent the installation position of the first path restricting member 40 from being displaced from the straight section 11A with respect to the wire harness main body 11.

Furthermore, it is possible to prevent the first path restricting member 40 from moving in the lengthwise direction of the wire harness main body 11 with respect to the second path restricting member 60, and therefore it is possible to desirably prevent the first path restricting member 40 from becoming detached from the second path restricting member 60 due to such movement.

(2) The first insertion port 40X of the first path restricting member 40 is open in a direction orthogonal to the lengthwise direction of the first path restricting member 40, and extends over the full length of the first path restricting member 40 in the lengthwise direction thereof. As a result, it is possible to attach the first path restricting member 40 to the exterior member 30 from the first insertion port 40X after performing terminal processing such as attaching the connectors C1 and C2 to the end portions of the electric wire member 20 in the lengthwise direction thereof. In this way, the first path restricting member 40 can be retrofitted. Therefore, it is possible to improve the assembly workability of the wire harness 10.

(3) The through hole 51 is provided as the first engaging portion of the first path restricting member 40, and the protruding portion 81 that is fitted into the through hole 51 through recess-protrusion fitting is provided as the second engaging portion of the second path restricting member 60. With this configuration, by fitting the protruding portion 81 into the through hole 51 through recess-protrusion fitting, it is possible to engage the through hole 51 and the protruding portion 81 with each other in the lengthwise direction of the wire harness main body 11.

(4) The through hole 51 is provided in an intermediate portion of the coupling portion 43 in the circumferential direction thereof, and the protruding portion 81 is provided on the inner surface of the covering main body portion 71. With this configuration, the protruding portion 81 is provided on the inner surface of the covering main body portion 71. Therefore, it is possible to prevent the first path restricting member 40 from moving with respect to the second path restricting member 60 in a state before the lid portion 72 of the covering portion 70 is closed.

(5) The first path restricting member 40 and the second path restricting member 60 are provided so as to partially overlap each other in the lengthwise direction of the wire harness main body 11. In this overlapping portion, the through hole 51 and the protruding portion 81 engage with each other in the lengthwise direction of the wire harness main body 11. With this configuration, due to the through hole 51 provided in the first path restricting member 40 itself and the protruding portion 81 provided in the second path restricting member 60 itself, it is possible to prevent the first path restricting member 40 and the second path restricting member 60 from being displaced relative to each other. Therefore, the number of parts can be reduced compared with the case where another member is used to prevent the first path restricting member 40 and the second path restricting member 60 from being displaced relative to each other.

(6) The covering portion 70 is provided with the covering main body portion 71 that is a portion of the main body portion 61 of the second path restricting member 60, and the lid portion 72 that is coupled to the covering main body portion 71. The covering portion 70 is formed in an annular shape that encloses the entirety of the outer circumferential surface of the connecting portion 50 and the entirety of the outer circumferential surface of the portion of the exterior member 30 to which the connecting portion 50 is attached, in the circumferential direction. With this configuration, despite the covering portion 70 having an annular shape that encloses the connecting portion 50 and the exterior member 30, the covering portion 70 is separated into the covering main body portion 71 and the lid portion 72, and therefore the second path restricting member 60 including the covering portion 70 can be retrofitted to the first path restricting member 40 and the exterior member 30. As a result, it is possible to further improve the assembly workability of the wire harness 10.

(7) The main body portion 61 is provided with the second insertion port 61X that is open in a direction orthogonal to the lengthwise direction of the second path restricting member 60, and extends over the full length of the second path restricting member 60 in the lengthwise direction thereof. As a result, it is possible to attach the second path restricting member 60 to the exterior member 30 from the second insertion port 61X after performing terminal processing such as attaching the connectors C1 and C2 to the end portions of the electric wire member 20 in the lengthwise direction thereof. In this way, the second path restricting member 60 can be retrofitted. Therefore, it is possible to improve the assembly workability of the wire harness 10.

(8) The first path restricting member 40 is provided with the protruding portions 45 and 46 that respectively protrude from the inner surfaces of the first end portion 41 and the second end portion 42 to come into contact with the outer surface of the exterior member 30. With this configuration, the exterior member 30 is pressed by the protruding portions 45 and 46 from the outside of the exterior member 30, for example. Therefore, it is possible to desirably prevent the first path restricting member 40 from becoming detached from the exterior member 30 through the first insertion port 40X.

(9) The horizontal cross-sectional shape of the first path restricting member 40 is uniform over substantially the entirety of the first path restricting member 40 in the lengthwise direction thereof. With this configuration, it is easier to manufacture the first path restricting member 40 by using an extrusion molding machine that extrudes the raw material of the first path restricting member 40 in the lengthwise direction thereof. Also, it is possible to manufacture a plurality of types of first path restricting members 40 with different sizes in the lengthwise direction thereof by using a single extrusion molding machine. For example, it is possible to manufacture a plurality of types of first path restricting members 40 with different sizes in the lengthwise direction thereof by cutting the base material of the first path restricting member 40 formed using a single extrusion molding machine, at any desired length, using a cutting machine.

(10) The through hole 51 is formed in the shape of an elongated slit that extends straight in the circumferential direction of the first path restricting member 40. With this configuration, it is possible to form the through hole 51 using a cutting machine for cutting the base material of the first path restricting member 40, for example. In this way, by using the same equipment to cut the base material of the first path restricting member 40 and to form the through hole 51, it is possible to improve the manufacturability of the first path restricting member 40.

Other Embodiments

The above embodiment can be modified and implemented as follows. The above embodiment and the following modifications can be implemented in combination with each other as long as no contradiction arises.

In the above embodiment, the shape, formation position, and number of the through hole 51 that serves as the first engaging portion and the protruding portion 81 that serves as the second engaging portion can be changed as appropriate. For example, as long as the first engaging portion and the second engaging portion have structures for engaging with each other in the lengthwise direction of the wire harness main body 11, other structures are not particularly limited.

The connecting portion 50 of the first path restricting member 40 in the above-described embodiment may be provided with a plurality of through holes 51, for example. If this is the case, the plurality of through hole 51 may be alternately displaced from one another in the lengthwise direction of the wire harness main body 11, for example.

The covering portion 70 of the second path restricting member 60 in the above-described embodiment may be provided with a plurality of protruding portions 81. If this is the case, the plurality of protruding portions 81 may be alternately displaced from one another in the lengthwise direction of the wire harness main body 11, for example.

Although the protruding portion 81 is provided on the inner surface of the covering main body portion 71 in the above-described embodiment, the present disclosure is not limited to such a configuration, and the protruding portion 81 may be provided on the inner surface of the lid portion 72. If this is the case, for example, when the protruding portion 81 provided on the inner surface of the lid portion 72 is fitted into the through hole 51 of the first path restricting member 40 through recess-protrusion fitting, the position of the first insertion port 40X of the first path restricting member 40 in the circumferential direction thereof is determined so that the first insertion port 40X faces toward the covering main body portion 71 of the covering portion 70.

In the above-described embodiment, the first engaging portion of the first path restricting member 40 is provided as the through hole 51, the second engaging portion of the second path restricting member 60 is provided as the protruding portion 81, and the first engaging portion and the second engaging portion engage with each other through recess-protrusion fitting. However, the recess-protrusion relationship thereof may be the other way around. If this is the case, for example, a protruding portion that serves as the first engaging portion that protrudes from the outer surface of the connecting portion 50 is provided on the first path restricting member 40, and a recessed portion (recess) that serves as the second engaging portion that fits onto the protruding portion through recess-protrusion fitting is provided in the second path restricting member 60.

In the above-described embodiment, the leading end of the protruding portion 81 comes into contact with the outer surface of an annular protrusion 31. However, the present disclosure is not limited to such a configuration. For example, the leading end of the protruding portion 81 may be fitted into an annular recess 32. For example, the protruding portion 81 may be modified so that the leading end of the protruding portion 81 does not come into contact with the outer surface of the exterior member 30.

In the above-described embodiment, the first engaging portion that fits onto the protruding portion 81 through recess-protrusion fitting is provided as a recessed portion (recess) that penetrates through the first path restricting member 40 in a radial direction thereof, i.e., the through hole 51. However, the present disclosure is not limited to such a configuration. For example, the first engaging portion may be provided as a recessed portion that does not penetrate through the first path restricting member 40. If this is the case, the recessed portion is formed so as to be recessed from the outer surface of the connecting portion 50 inward in the radial direction.

Figure 7:
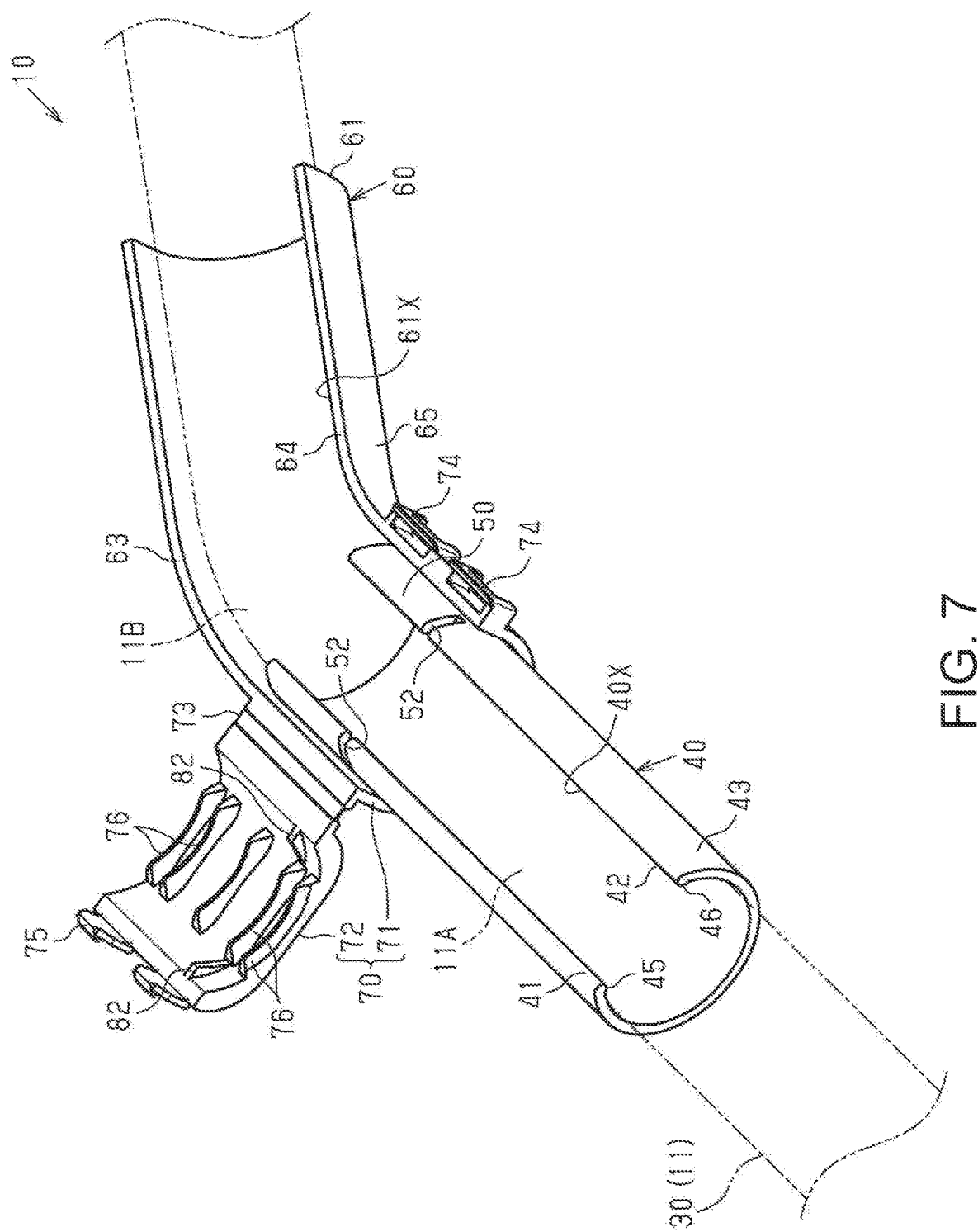
FIG. 7 is a schematic perspective view showing a wire harness according to a modified example.

For example, as shown in FIG. 7, the first engaging portion may be changed to cutouts 52 that each extend from an end portion of the connecting portion 50 in the circumferential direction thereof, in the circumferential direction of the first path restricting member 40. The connecting portion 50 in the present modification has a plurality of (two in this example) cutouts 52. For example, the cutouts 52 are provided in the first end portion 41 of the connecting portion 50, and the second end portion 42 of the connecting portion 50. For example, each cutout 52 extends from the first end portion 41 or the second end portion 42, in the circumferential direction of the first path restricting member 40. Each cutout 52 is formed so as to be longer in the circumferential direction of the wire harness main body 11 than in the lengthwise direction of the wire harness main body 11. For example, in the state where the connecting portion 50 is fitted into the covering main body portion 71, the cutouts 52 are formed in a portion of the connecting portion 50 that protrudes farther outward of the third end portion 63 and the fourth end portion 64 of the covering main body portion 71.

In the present modification, the second engaging portion may be changed to protruding portions 82 that are provided on the inner surface of the lid portion 72. The lid portion 72 in the present modification has two protruding portions 82 that are respectively fitted into the two cutouts 52 through recess-protrusion fitting. Each protruding portion 82 protrudes from the inner surface of the lid portion 72 inward in a radial direction of the covering portion 70. For example, the two protruding portions 82 are respectively provided on both sides of the protrusions 76 in the circumferential direction of the lid portion 72. When the lid portion 72 is at the closed position, the protruding portions 82 are respectively fitted into the cutouts 52 through recess-protrusion fitting.

With this configuration, when the protruding portions 82 are fitted into the cutouts 52 through recess-protrusion fitting, the protruding portions 82 and the cutouts 52 engage with each other in the lengthwise direction of the wire harness main body 11. As a result, it is possible to prevent the first path restricting member 40 from moving in the lengthwise direction of the wire harness main body 11 with respect to the second path restricting member 60. Also, due to the protruding portions 82 being provided on the inner surface of the lid portion 72, the protruding portions 82 and the cutouts 52 can be fitted to each other through recess-protrusion fitting at the same time when the lid portion 72 is closed, for example.

In the example shown in FIG. 7, the positions at which the cutouts 52 are formed may be changed as appropriate. For example, two cutouts 52 may be displaced from each other in the lengthwise direction of the wire harness main body 11. Similarly, the positions at which the protruding portions 82 are formed may be changed as appropriate.

Figure 8:
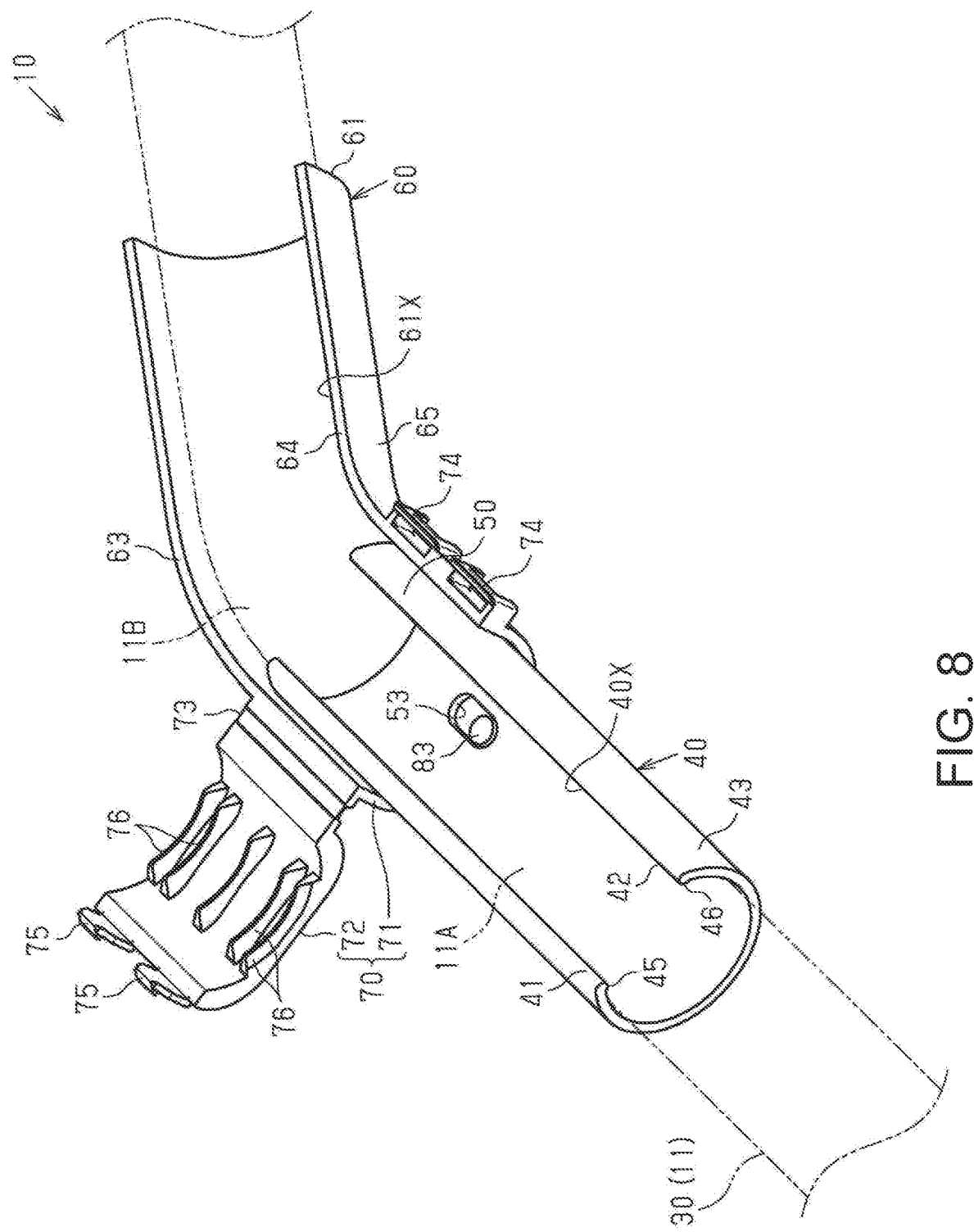
FIG. 8 is a schematic perspective view showing a wire harness according to a modified example.

For example, as shown in FIG. 8, the first engaging portion may be changed to an elongated hole 53 that is elongated in the lengthwise direction of the wire harness main body 11. For example, the elongated hole 53 penetrates through the coupling portion 43 of the connecting portion 50 in a radial direction of the exterior member 30. The elongated hole 53 is formed so as to be longer in the lengthwise direction of the wire harness main body 11 than in the circumferential direction of the wire harness main body 11. For example, the elongated hole 53 is formed so that the size thereof in the lengthwise direction of the wire harness main body 11 is twice or more as large as the size thereof in the circumferential direction of the wire harness main body 11. For example, the elongated hole 53 has an ellipsoidal shape when seen in the penetration direction of the elongated hole 53. For example, the elongated hole 53 is provided in an intermediate portion of the coupling portion 43 of the connecting portion 50 in the circumferential direction. For example, the elongated hole 53 is located so as to overlap the first insertion port 40X in a radial direction of the exterior member 30, in the circumferential direction of the coupling portion 43. For example, the elongated hole 53 is provided in a portion of the connecting portion 50 in the lengthwise direction thereof.

In the present modification, the second engaging portion may be changed to a protruding portion 83 that is provided on the inner surface of the covering main body portion 71. For example, the protruding portion 83 is formed in a columnar shape. For example, the size of the protruding portion 83 is smaller than the size of the elongated hole 53 in the lengthwise direction of the wire harness main body 11. For example, the size of the elongated hole 53 is twice or more as large as the size of the protruding portion 83 in the lengthwise direction of the wire harness main body 11.

With this configuration, the protruding portion 83 provided on the inner surface of the covering main body portion 71 is fitted into the elongated hole 53 provided in the coupling portion 43 of the connecting portion 50 through recess-protrusion fitting, and thus the elongated hole 53 and the protruding portion 83 engage with each other in the lengthwise direction of the wire harness main body 11. As a result, it is possible to prevent the first path restricting member 40 from moving in the lengthwise direction of the wire harness main body 11 with respect to the second path restricting member 60. Also, the size of the elongated hole 53 is larger than the size of the protruding portion 83 in the lengthwise direction of the wire harness main body 11, and therefore the protruding portion 83 is movable within the elongated hole 53 in the lengthwise direction of the wire harness main body 11. That is to say, the first path restricting member 40 can move in the lengthwise direction of the wire harness main body 11 relative to the second path restricting member 60 within the range where the protruding portion 83 is located in the elongated hole 53. Therefore, it is possible to adjust the position of the first path restricting member 40 in the lengthwise direction of the wire harness main body 11, relative to the second path restricting member 60.

Figure 9:
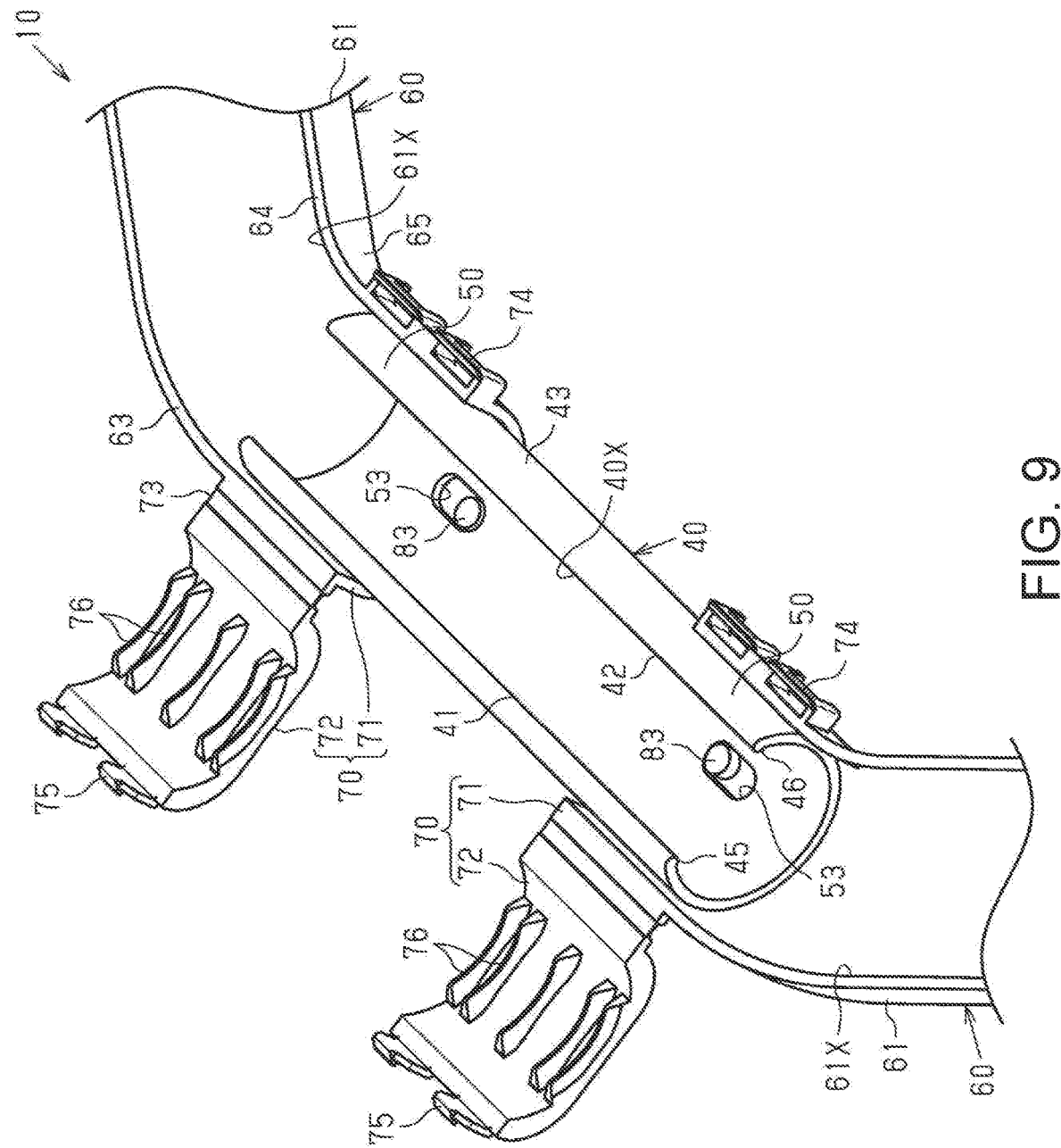
FIG. 9 is a schematic perspective view showing a wire harness according to a modified example.

For example, as shown in FIG. 9, second path restricting members 60 may be respectively provided on both sides in the lengthwise direction of the first path restricting member 40. If this is the case, connecting portions 50 that each have the first engaging portion may be respectively provided at two end portions of the first path restricting member 40 in the lengthwise direction, for example. The first engaging portion of each of the two connecting portions 50 may have the same shape or different shapes. In the example shown in the figure, both of the two connecting portions 50 have an elongated hole 53 that is longer in the lengthwise direction of the wire harness main body 11 than in the circumferential direction of the wire harness main body 11. Also, the two second path restricting members 60 respectively provided on both sides of the first path restricting member 40 in the lengthwise direction may have the same shape or different shapes. Each of the two second path restricting member 60 has a covering portion 70 that has the second engaging portion, for example. The second engaging portion of each of the two second path restricting members 60 may have the same shape or different shapes. In the example shown in the figure, the respective second engaging portions of the two second path restricting member 60 are columnar protruding portions 83 that fit into the elongated holes 53 through recess-protrusion fitting. The size of each elongated hole 53 is larger than the size of each protruding portion 83 in the lengthwise direction of the wire harness main body 11.

With this configuration, the protruding portions 83 are respectively movable within the elongated holes 53 in the lengthwise direction of the wire harness main body 11. Therefore, it is possible to adjust the position of the first path restricting member 40 in the lengthwise direction of the wire harness main body 11, relative to the two second path restricting members 60.

In the above-described embodiment, a configuration in which the first engaging portion and the second engaging portion are fitted to each other through recess-protrusion fitting is embodied. However, the present disclosure is not limited to such a configuration. For example, both the first engaging portion and the second engaging portion may be protruding portions as long as the first engaging portion and the second engaging portion are configured to be able to engage with each other in the lengthwise direction of the wire harness main body 11.

The configuration of the second path restricting member 60 in the above-described embodiment may be changed as appropriate. For example, if the second path restricting member 60 has a second engaging portion that can engage with the first engaging portion, and the covering portion 70 that covers the connecting portion 50, other configurations are not particularly limited.

The protrusions 76 of the second path restricting member 60 in the above-described embodiment may be omitted.

In the second path restricting member 60 in the above-described embodiment, the main body portion 61 (the covering main body portion 71) and the lid portion 72 are formed integrally with each other. However, the present disclosure is not limited to such a configuration, and the main body portion 61 and the lid portion 72 may be separated. That is to say, the main body portion 61 and the lid portion 72 may be separate parts.

The lid portion 72 of the second path restricting member 60 in the above-described embodiment may be omitted.

The bent shape of the main body portion 61 of the second path restricting member 60 in the above-described embodiment may be changed as appropriate.

The horizontal cross-sectional shape of the inner surface of the main body portion 61 in the above-described embodiment is not limited to a U shape, and may be changed to an arc shape, an ellipsoidal arc shape, or the like, for example.

The second path restricting member 60 in the above-described embodiment may be provided with a lid portion that is coupled to the main body portion 61 other than the covering main body portion 71.

Although the second path restricting member 60 in the above-described embodiment is formed so as to restrict the path of the bent section 11B of the wire harness main body 11, the present disclosure is not limited to such a configuration. For example, the shape of the second path restricting member 60 may be changed so as to restrict the path of the straight section 11A of the wire harness main body 11. In the second path restricting member 60 in this case, for example, the bent shape in the main body portion 61 is changed to a straight shape.

In the above-described embodiment, the second path restricting member 60 is embodied as an attaching member that has the covering portion 70. However, the present disclosure is not limited to such a configuration. For example, a structure that is only provided with the covering portion 70 may be embodied as the attaching member.

The configuration of the first path restricting member 40 in the above-described embodiment may be changed as appropriate. For example, as long as the first path restricting member 40 has the first insertion port 40X and is configured to be attachable to the outer circumferential surface of the exterior member 30, other configurations are not specifically limited.

Figure 10:
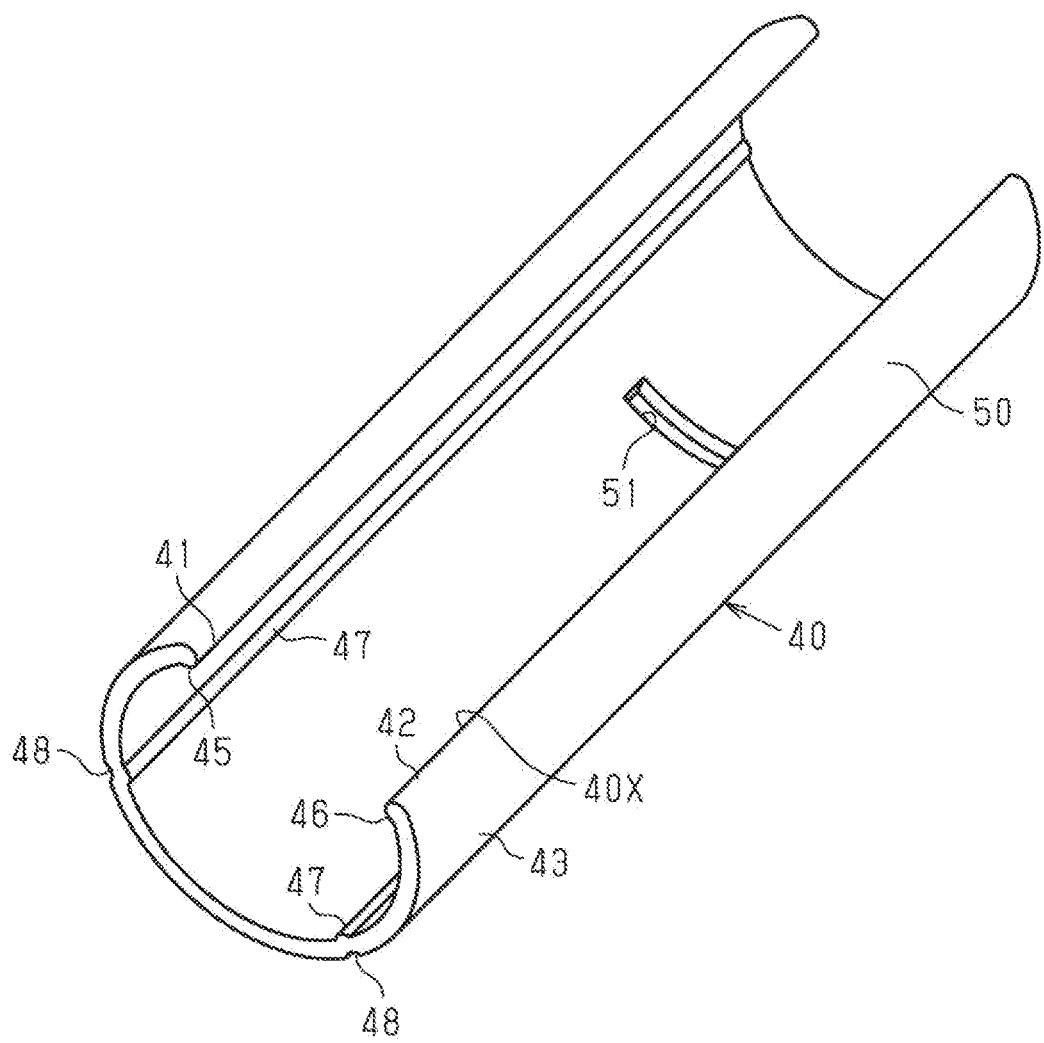
FIG. 10 is a schematic perspective view showing a first path restricting member according to a modified example.
Figure 11:
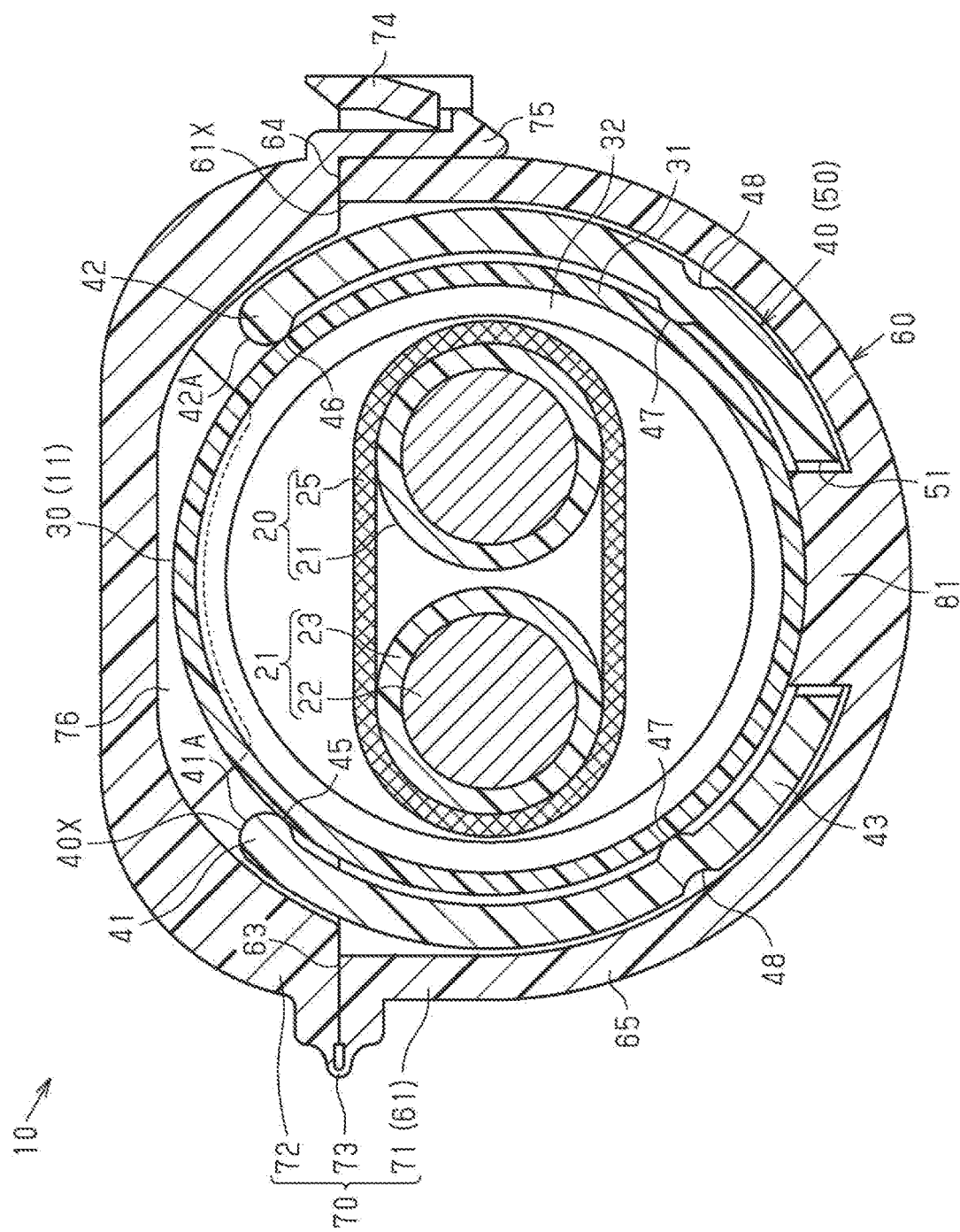
FIG. 11 is a schematic lateral perspective view showing a wire harness according to a modified example.

For example, as shown in FIGS. 10 and 11, protruding portions 47 that protrudes from the inner surface of the coupling portion 43 of the first path restricting member 40 may be provided. The first path restricting member 40 in the present modification is provided with two protruding portions 47. As shown in FIG. 11, each protruding portion 47 protrudes from the inner surface of the coupling portion 43 toward the exterior member 30 and comes into contact with the outer surface of the exterior member 30. For example, each of the protruding portions 47 comes into contact with the outer surfaces of annular protrusions 31 of the exterior member 30. The two protruding portions 47 are provided at intervals in the circumferential direction of the first path restricting member 40. For example, as shown in FIG. 10, each of the protruding portions 47 extends in the lengthwise direction of the first path restricting member 40, over the full length of the first path restricting member 40 in the lengthwise direction thereof. For example, as shown in FIG. 11, each protruding portion 47 has a semicircular horizontal cross-sectional shape.

With this configuration, it is possible to make the protruding portion 45, the protruding portion 46, and the protruding portions 47 come into contact with the outer surface of the exterior member 30. Therefore, it is possible to prevent the first path restricting member 40 from rattling on the exterior member 30.

As shown in FIGS. 10 and 11, one or more grooves 48 that each extend in the lengthwise direction of the coupling portion 43 may be provided on the outer surface of the coupling portion 43. The first path restricting member 40 in the present modification is provided with two grooves 48. For example, each of the two grooves 48 is provided on the outer surface of the portion of the coupling portion 43 where the protruding portions 47 are provided. For example, as shown in FIG. 10, each of the two grooves 48 extends in the lengthwise direction of the first path restricting member 40, over the full length of the first path restricting member 40 in the lengthwise direction thereof. For example, as shown in FIG. 11, each groove 48 has a semicircular horizontal cross-sectional shape.

With this configuration, it is easier to deform the coupling portion 43 toward the outer circumferential surface at the grooves 48, and it is easier to expand the first insertion port 40X. Therefore, it is easier to insert the exterior member 30 into the first path restricting member 40 via the first insertion port 40X. As a result, it is possible to improve the ease of assembling of the first path restricting member 40.

In the modification shown in FIGS. 10 and 11, each protruding portion 47 may be provided on a portion of the first path restricting member 40 in the lengthwise direction thereof.

In the modification shown in FIGS. 10 and 11, each groove 48 may be provided on a portion of the first path restricting member 40 in the lengthwise direction thereof.

The protruding portion 45 in the above-described embodiment may be provided further away from the first insertion port 40X than the first leading end 41A of the first end portion 41 in the circumferential direction of the first path restricting member 40.

The protruding portion 46 in the above-described embodiment may be provided further away from the first insertion port 40X than the second leading end 42A of the second end portion 42 in the circumferential direction of the first path restricting member 40.

The protruding portions 45 and 46 in the above-described embodiment may be provided on a portion of the first path restricting member 40 in the lengthwise direction thereof.

At least either one of the protruding portions 45 and 46 in the above-described embodiment may be omitted.

The first path restricting member 40 of the above-described embodiment may be configured so that the thickness of the coupling portion 43 in a radial direction thereof varies in the circumferential direction.

The shape of the coupling portion 43 of the first path restricting member 40 in the above-described embodiment is not limited to an arc shape, and may be changed to an ellipsoidal arc shape, a U shape, or the like, for example.

In the above-described embodiment, the first path restricting member 40 and the second path restricting member 60 are more rigid than the exterior member 30. However, the present disclosure is not limited to such a configuration, and the first path restricting member 40 and the second path restricting member 60 may be as rigid as the exterior member 30, or less rigid than the exterior member 30. That is to say, as long as the first path restricting member 40 and the second path restricting member 60 make the wire harness main body 11 less bendable than when the first path restricting member 40 and the second path restricting member 60 are not attached to the wire harness main body 11, the first path restricting member 40 and the second path restricting member 60 do not necessarily have to be more rigid than the exterior member 30.

At least either one of the fixing members 91 and 92 in the above-described embodiment may be omitted.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with an annular protrusion 31 or an annular recess 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body that includes an electric wire and an exterior tube that encloses an outer circumferential surface of the electric wire;
a path restricting member that is attached to an outer circumferential surface of the exterior tube and restricts a path of the wire harness main body; and
an attaching member that is attached, at one portion, to an outer circumferential surface of a portion of the path restricting member in a lengthwise direction of the path restricting member and that is configured to be fixed, at an other portion, to an object, wherein:
the path restricting member includes a first insertion port that is open in a direction orthogonal to the lengthwise direction of the path restricting member, and extends over a full length of the path restricting member in the lengthwise direction of the path restricting member,
the path restricting member includes a connecting portion that includes a first engagement,
the attaching member includes a cover that covers an outer circumferential surface of the connecting portion,
the cover includes a second engagement that engages with the first engagement in the lengthwise direction of the wire harness main body,
the path restricting member is a first path restricting member,
the attaching member is a second path restricting member that is attached to the outer circumferential surface of the exterior tube and restricts the path of the wire harness main body,
the connecting portion is provided at an end of the first path restricting member in the lengthwise direction thereof,
the cover is provided at an end of the second path restricting member in a lengthwise direction of the second path restricting member,
the cover is formed in an annular shape that encloses an entirety of the outer circumferential surface of the connecting portion and the entirety of an outer circumferential surface of a portion of the exterior tube to which the connecting portion is attached, in a circumferential direction,
the cover includes a portion of a main body portion of the second path restricting member, and a lid that is coupled to the main body portion,
the first path restricting member includes:
a first end and a second end that are two ends of the first path restricting member in a circumferential direction of the first path restricting member, and define the first insertion port;
a coupling portion that couples the first end and the second end to each other; and
a protrusion that protrudes from an inner surface of at least one of the first end and the second end, and comes into contact with an outer surface of the exterior tube, the first engagement is provided in an intermediate portion of the coupling portion in a circumferential direction thereof, the first engagement is a through hole that penetrates through the coupling portion in a radial direction of the exterior tube, the second engagement is provided on an inner surface of the main body portion of the cover, and the second engagement is a first protrusion that is fitted into the through hole through a recess-protrusion fitting.

2. A wire harness comprising:

a wire harness main body that includes an electric wire and an exterior tube that encloses an outer circumferential surface of the electric wire;

a path restricting member that is attached to an outer circumferential surface of the exterior tube and restricts a path of the wire harness main body; and an attaching member that is attached, at one portion, to an outer circumferential surface of a portion of the path restricting member in a lengthwise direction of the path restricting member and that is configured to be fixed, at an other portion, to an object, wherein:

the path restricting member includes a first insertion port that is open in a direction orthogonal to the lengthwise direction of the path restricting member, and extends over a full length of the path restricting member in the lengthwise direction of the path restricting member, the path restricting member includes a connecting portion that includes a first engagement, the attaching member includes a cover that covers an outer circumferential surface of the connecting portion, the cover includes a second engagement that engages with the first engagement in the lengthwise direction of the wire harness main body, the path restricting member is a first path restricting member, the attaching member is a second path restricting member that is attached to the outer circumferential surface of the exterior tube and restricts the path of the wire harness main body, the connecting portion is provided at an end of the first path restricting member in the lengthwise direction thereof, the cover is provided at an end of the second path restricting member in a lengthwise direction of the second path restricting member, the cover is formed in an annular shape that encloses an entirety of the outer circumferential surface of the connecting portion and the entirety of an outer circumferential surface of a portion of the exterior tube to which the connecting portion is attached, in a circumferential direction, the cover includes a portion of a main body portion of the second path restricting member, and a lid that is coupled to the main body portion, the first path restricting member includes:
 a first end and a second end that are two ends of the first path restricting member in a circumferential direction of the first path restricting member, and define the first insertion port;
 a coupling portion that couples the first end and the second end to each other; and
 a protrusion that protrudes from an inner surface of at least one of the first end and the second end, and comes into contact with an outer surface of the exterior tube, the first engagement is a cutout that extends from at least one of the first end and the second end in the circumferential direction of the first path restricting member, the second engagement is provided on an inner surface of the lid, and the second engagement is a second protrusion that is fitted into the cutout through recess-protrusion fitting.

* * * * *